United States Patent
Dohnomae

[11] Patent Number: 6,072,588
[45] Date of Patent: Jun. 6, 2000

[54] METHOD OF GENERATING PROOF DATA AND METHOD OF GENERATING PROOF

[75] Inventor: Yoshifumi Dohnomae, Kanagawa-ken, Japan

[73] Assignee: Fuji Photo Film Co., Ltd., Kanagawa-ken, Japan

[21] Appl. No.: 08/820,659

[22] Filed: Mar. 18, 1997

[30] Foreign Application Priority Data

Apr. 2, 1996 [JP] Japan ................................ 8-080283
Jul. 9, 1996 [JP] Japan ................................ 8-179122

[51] Int. Cl.[7] ........................................... H04N 1/52
[52] U.S. Cl. .......................................... 358/1.9; 382/162
[58] Field of Search .................................. 382/162, 237, 382/270, 299; 358/534, 536, 456, 298; 395/109

[56] References Cited

U.S. PATENT DOCUMENTS

| | | | |
|---|---|---|---|
| 4,792,979 | 12/1988 | Nomura et al. | 382/169 |
| 5,475,509 | 12/1995 | Okamoto | 358/518 |
| 5,734,801 | 3/1998 | Noguchi et al. | 358/504 |
| 5,760,920 | 6/1998 | Lin et al. | 382/237 |

FOREIGN PATENT DOCUMENTS

| | | |
|---|---|---|
| 0 334 518 A3 | 9/1989 | European Pat. Off. . |
| 0 621 723 A2 | 10/1994 | European Pat. Off. . |
| 8-192540 | 7/1996 | Japan ............................. B41J 2/525 |

*Primary Examiner*—Amelia Au
*Assistant Examiner*—Samir Ahmed
*Attorney, Agent, or Firm*—Sughrue, Mion, Zinn, Macpeak & Seas, PLLC

[57] ABSTRACT

Cumulative histograms generated based on threshold matrixes with respect to halftone-dot area percentage data of the four plates C, M, Y, K are referred to for thereby determining the existential probability of halftone dots. Then, average colorimetric data are calculated from predetermined colorimetric data with respect to every $2^n$ colors using the area percentage as a weighting coefficient. An anti-aliasing filtering process is effected on the average colorimetric data to produce device-independent image data for a color printer. The cumulative histograms are emphasized and the average colorimetric data are emphasized to accurately reproduce a peculiar pattern such as a rosette image which will appear on a printed document on a proof which is outputted from a low-resolution color printer. A process is provided for changing the halftone-dot area percentage data based on the type (wood-free paper, art paper, or the like) of paper of a print sheet of the printed document and the halftone-dot area percentage data on presensitized plates, when the halftone-dot area percentage data are converted into bit map data for the color printer, for thereby reproducing "impression irregularity" and "harshness" out of the visual irregular qualities of paper.

6 Claims, 27 Drawing Sheets

FIG. 3

| $d_{11}$ ($d_{ij}$) | | | | AF | | | | |
|---|---|---|---|---|---|---|---|---|
| 4 | 10 | 16 | 20 | 22 | 20 | 16 | 10 | 4 |
| 10 | 25 | 40 | 50 | 55 | 50 | 40 | 25 | 10 |
| 16 | 40 | 64 | 80 | 88 | 80 | 64 | 40 | 16 |
| 20 | 50 | 80 | 100 | 110 | 100 | 80 | 50 | 20 |
| 22 | 55 | 88 | 110 | 121 | 110 | 88 | 55 | 22 |
| 20 | 50 | 80 | 100 | 110 | 100 | 80 | 50 | 20 |
| 16 | 40 | 64 | 80 | 88 | 80 | 64 | 40 | 16 |
| 10 | 25 | 40 | 50 | 55 | 50 | 40 | 25 | 10 |
| 4 | 10 | 16 | 20 | 22 | 20 | 16 | 10 | 4 |

$d_{55}$

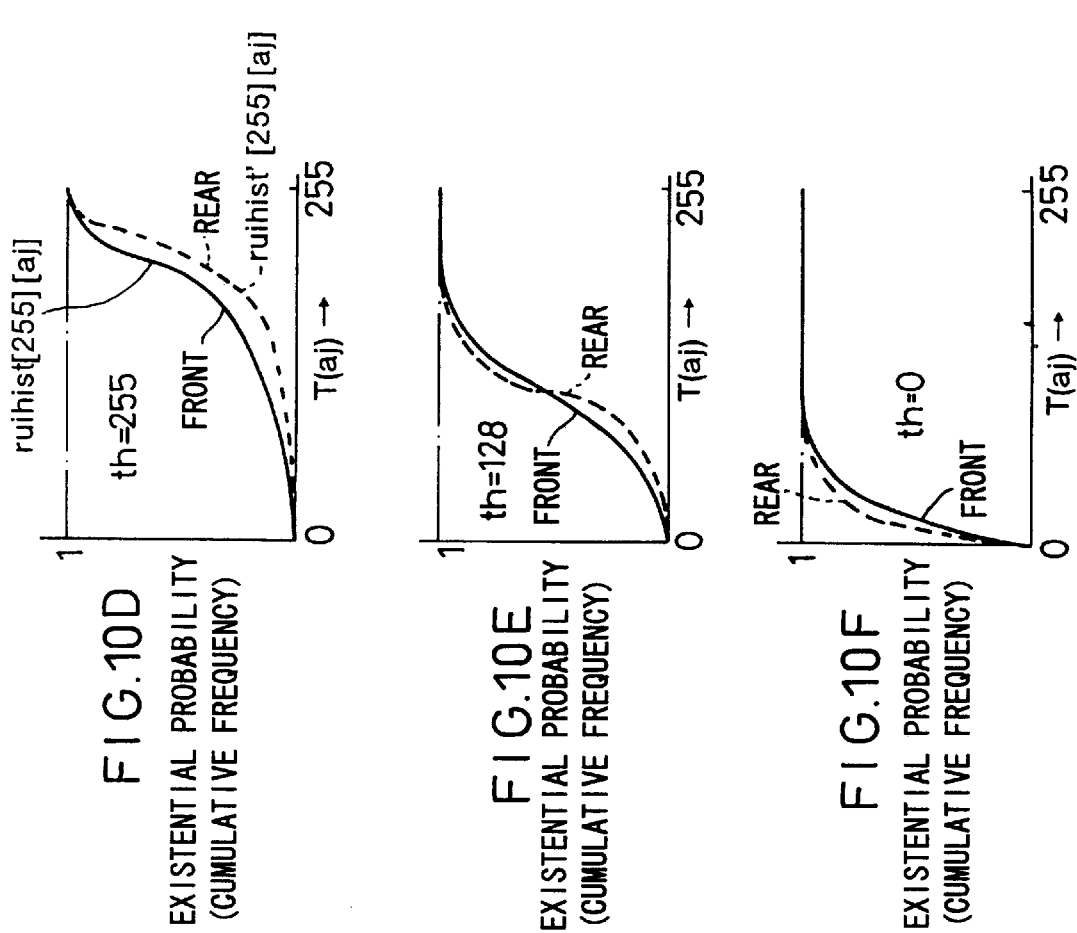
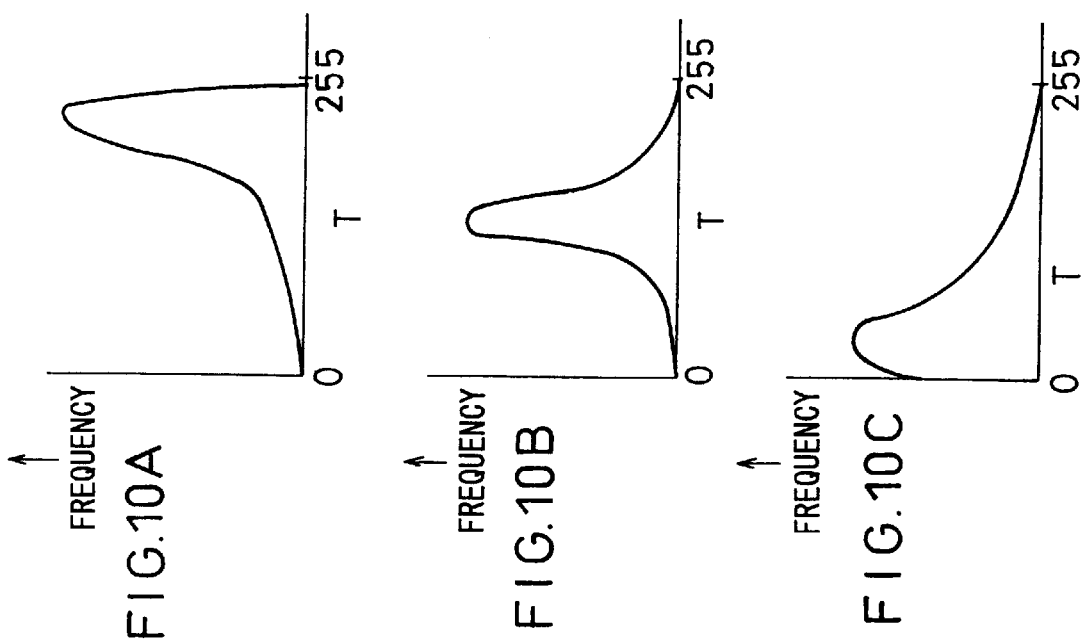

FIG. 13

F I G. 18
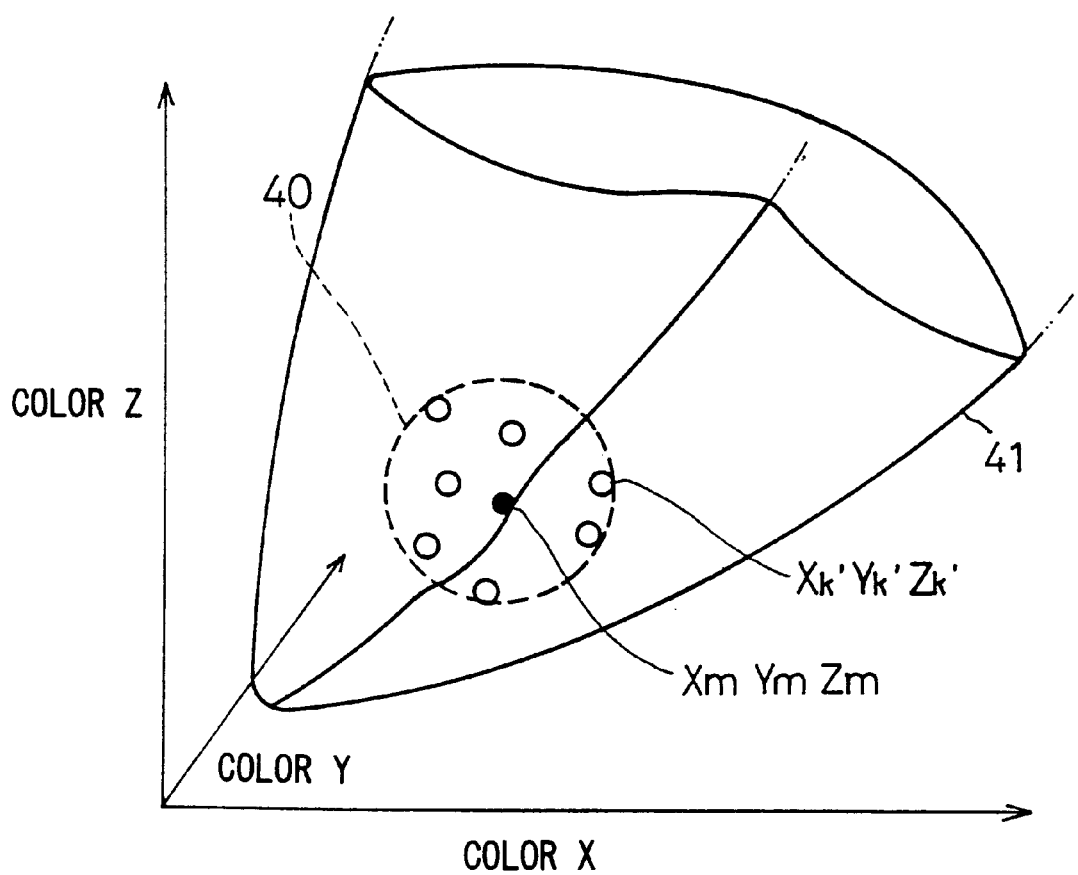

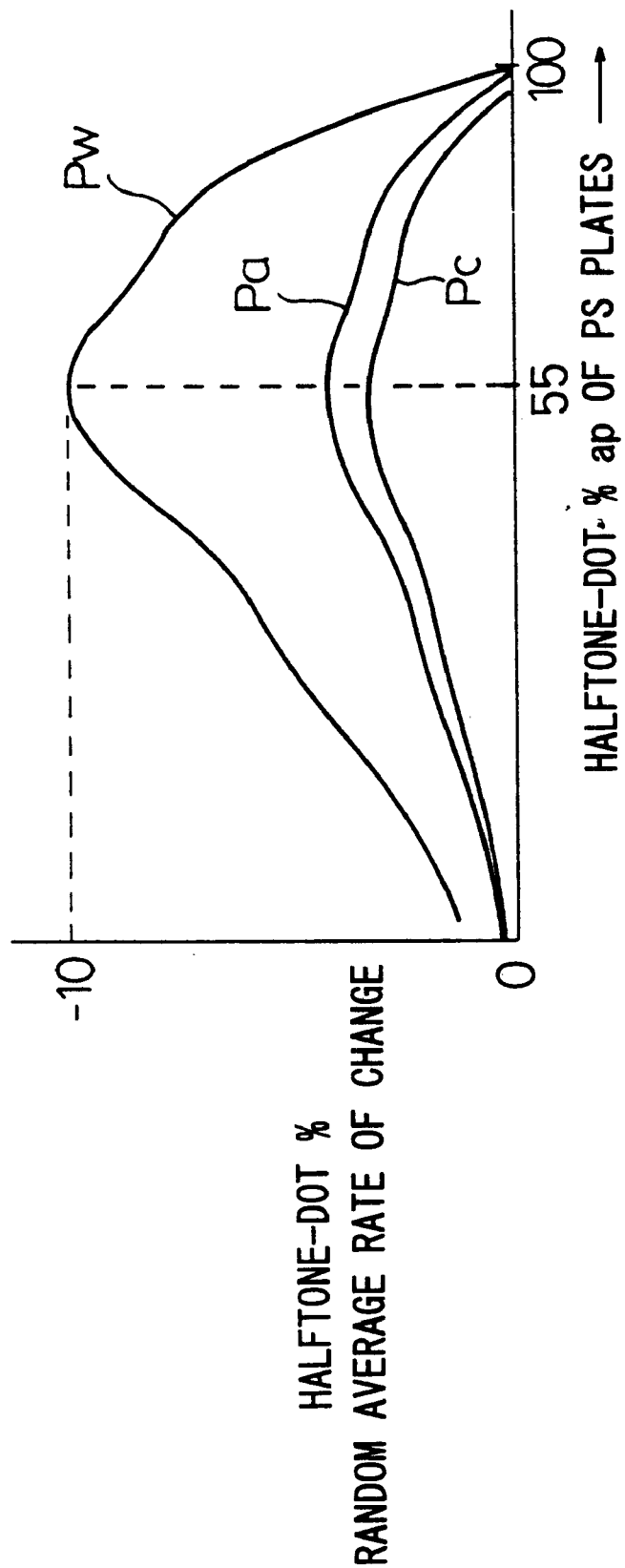
F I G. 21

METHOD OF GENERATING PROOF DATA AND METHOD OF GENERATING PROOF

BACKGROUND OF THE INVENTION

1. Field of the Invention

The present invention relates to a method of generating color proof data and a method of generating a color proof in a system for generating a color proof as color pixel images on a sheet according to a density gradation process with an image output device such as a color printer or the like, so that a color proof with a color image formed thereon can be generated for proof reading before a printed color document carrying a half-tone dot image is produced by a color printing machine having rotary presses or the like with press plates mounted thereon.

2. Description of the Related Art

It has heretofore been customary to produce a color proof for examining and correcting colors, etc. before a printed color document which carries a halftone dot image on a final print sheet such as of wood-free paper, coated paper, or art paper is produced by a color printing press.

Color printers are used to produce color proofs because the color printers are relatively simple in structure and inexpensive to manufacture and can produce hard copies with images formed on sheets a plurality of times in a short period of time since, as well known in the art, they do not need the production of process-plate films and presensitized plates which are required by color printing machines.

FIG. 27 of the accompanying drawings shows the sequence of a conventional process of producing a color proof with a color printer.

According to the conventional process of producing a color proof, as shown in FIG. 27, an image on an image document 2 is two-dimensionally read by an image reader such as a color scanner having a CCD linear image sensor or the like, and gradation (continuous tone) image data Ia of each of the colors R (red), G (green), and B (blue) are generated from the read image in a step S1 (image reading process).

Then, the RGB gradation image data Ia are converted by a color conversion process using a color conversion look-up table or the like into halftone-dot area percentage data (also referred to as halftone-dot percentage data or original image pixel halftone-dot percentage data) aj of the four plates of respective colors C (cyan), M (magenta), Y (yellow), and K (black), where j=0, 1, 2, 3 (0 represents the color C, 1 the color M, 2 the color Y, and 3 the color K) in a step S2. The color conversion process has various versions corresponding to different color printing machines, and those versions are based on know-hows of various printing companies depending on their color printing machines.

Images on printed color documents produced by the color printing machines are halftone-dot images. To produce a printed color document actually, halftone-dot area percentage data aj produced by a color conversion process are developed into bit map data, and a process-plate film or the like is generated based on the bit map data. Because an automatic image developing machine is required, a process following the generation of the process-plate film is considerably complex.

In order to facilitate the production of a color proof CPa, a digital color printer (DP) 3 is employed for the reasons described above. The DP 3 forms an image on a donor film by digitally controlling the intensity and time of three-primary emission of LED (light-emitting diode) light or a laser beam per pixel, and transfers the image from the donor film to an image-receiving sheet to form the image thereon. The DP 3 is much more inexpensive than a color printing machine which generates presensitized plates from printing plates and produces a printed color document with the presensitized plates. The DP 3 is also smaller in volume and lighter in weight.

In order to employ the DP 3, it is necessary to convert the halftone-dot area percentage data aj of the four plates C, M, Y, K produced in the step S2 into image data (called "common color space data") independent of devices including a printing device, a CRT, a photographic device, an LET, etc., e.g., tristimulus value data X, Y, Z.

Therefore, the halftone-dot area percentage data aj of the four plates C, M, Y, K are converted into tristimulus value data X, Y, Z by a image data processing in a step S4. The image data processing has heretofore been carried out by a process which uses the Neugebauer's equation.

Prior to the step S4, colorimetric data Xi, Yi, Zi (i represents $2^4$=16 colors for the four plates C, M, Y, K, i=0~15) for the colors of printing inks are measured by a calorimeter in a step S3. For measuring the colorimetric data Xi, Yi, Zi, the 16 colors are printed on a print sheet which will be used to produce a printed color document by a color printing machine, thereby producing color patches. Such a printing process is usually called a solid printing process. The 16 colors correspond to the presence and absence of the respective colors C, M, Y, K, which represent a combination of $2^4$=16 colors.

Specifically, the 16 colors include the color W (white) which is present when nothing is printed on the print sheet, the primary colors C, M, Y, the color K (black), and the mixed colors C+M, C+Y, C+K, M+Y, M+K, Y+K, C+M+Y, C+M+K, C+Y+K, M+Y+K, and C+M+Y+K. The colors of reflections from the colors printed on the print sheet are measured by a calorimeter such as a spectrometer, for example, thereby producing the colorimetric data Xi, Yi, Zi.

According to the process which uses the Neugebauer's equation, the colorimetric data Xi, Yi, Zi are multiplied by a coefficient of halftone-dot area percentage data hi (i=0~15), as shown below, thus producing the tristimulus value data X, Y, Z in the step S4.

$$X = \Sigma hi \cdot Xi,$$

$$Y = \Sigma hi \cdot Yi,$$

and $$Z = \Sigma hi \cdot Zi \qquad (1)$$

The halftone-dot area percentage data hi (i=0~15) of the basic 16 colors in the equations (1) are determined from the halftone-dot area percentage data aj according to probability calculations as follows:

$$h0 = (1-c)(1-m)(1-y)(1-k),$$

$$h1 = c \cdot (1-m)(1-y)(1-k),$$

$$h2 = (1-c) \cdot m \cdot (1-y)(1-k),$$

$$h3 = c \cdot m \cdot (1-y)(1-k),$$

$$h4 = (1-c)(1-m) \cdot y \cdot (1-k),$$

$$h5 = c \cdot (1-m) \cdot y \cdot (1-k),$$

$$h6 = (1-c) \cdot m \cdot y \cdot (1-k),$$

$h7 = c \cdot m \cdot y \cdot (1-k),$ $h8 = (1-c)(1-m)(1-y) \cdot k,$ $h9 = c \cdot (1-m)(1-y) \cdot k,$ $h10 = (1-c) \cdot m \cdot (1-y) \cdot k,$ $h11 = c \cdot m \cdot (1-y) \cdot k,$ $h12 = (1-c)(1-m) \cdot y \cdot k,$ $h13 = c \cdot (1-m) \cdot y \cdot k,$ $h14 = (1-c) \cdot m \cdot y \cdot k,$ and $$h15 = c \cdot m \cdot y \cdot k \qquad (2)$$

where the halftone-dot area percentage data aj (j=0~3) are set to a0=c, a1=m, a2=y, a3=k for an easier intuitive understanding, and c, m, y, k represent existential probability values ranging from 0 to 1.0 converted from (1/255) to which the halftone-dot area percentage data aj of the colors C, M, Y, K are set.

In the equations (2), h3, for example, represents an area percentage of the color C+M, and can be determined by multiplying the probability "c" that the plate of the color C exists, the probability "m" that the plate of the color M exists, the probability (1−y) that the plate of the color Y does not exist, and the probability (1−k) that the plate of the color K does not exist. Therefore, the Neugebauer's equation expressed by the equations (1) can be understood as being an equation based on the theory of probability. The tristimulus value data X, Y, Z thus generated according to the equations (1) are supplied to the DP 3. The DP 3 converts the tristimulus value data X, Y, Z into data of the three primaries with respect to the laser beam or the like, i.e., image data depending on the devices, which may also be called inherent color space data, based on a look-up table (LUT), and thereafter generates the color proof CPa, which is a hard copy with an image formed on a sheet, based on the image data.

In the case where the tristimulus value data X, Y, Z for the DP 3 are generated according to the Neugebauer's equation, the colors of a printed color document to be produced can accurately be reproduced in the image on the hard copy because the colorimetric data measured by a calorimeter as representing the colors of an image to be formed on the printed color document by the color printing machine are employed. However, a peculiar pattern as an image structure caused by interference fringes such as moiré, a rosette image, or the like which appears on a printed color document cannot be reproduced in the image on the hard copy.

If such a peculiar pattern actually appears on a printed color document, then it should also accurately be reproduced on a color proof CPa which is outputted by the DP 3. In this respect, the conventional color proof CPa which fails to reproduce a peculiar pattern thereon cannot be said as an accurate proof for a printed color document.

It is believed that no peculiar pattern can be reproduced on a hard copy produced by the DP 3 because the Neugebauer's equation is based on the theory of probability as described above.

For reproducing a peculiar pattern without relying on the process illustrated in FIG. 27, it is necessary for an image output device which outputs a hard copy to have a mechanism, such as a small-size proof printing machine, for producing the same image structure as that of a printed document which is to be approximated. It is difficult and substantially expensive for such a mechanism to cope with all of various printing conditions.

The inventor of the present invention has made extensive research efforts to confirm that a peculiar pattern such as moiré, a rosette image, or the like, which is peculiar to a printed document, may accurately be reproduced on a color proof by generating pixel data as input image data for a color printer without relying on the Neugebauer's equation. As a result, the inventor has reached an idea, which serves as a basis for the present invention, for accurately reproducing the colors of a print image and also reproducing a peculiar pattern such as moiré, a rosette image, or the like of a halftone-dot image, as disclosed in Japanese laid-open patent publication No. 8-192540.

Another process for reproducing a peculiar pattern such as moiré, a rosette image, or the like with a simple device such as a color printer or the like is disclosed as a method of generating proof in U.S. patent application Ser. No. 08/734, 018 filed by the applicant of the present application.

According to the disclosed process, the halftone-dot area percentage data of at least three colors including the three primaries are developed into bit map data, and a proof for a printed color document is generated based on the bit map data by a DP or the like. Specifically, while a spatial frequency response peculiar to printed halftone dots of the printed color document is being maintained, an image structure simulation process including a filtering process for cutting off a spatial frequency response inherent in the DP is carried out, and thereafter color shifts caused by the image structure simulation process are corrected, after which color shifts to be caused when the DP is used are corrected.

The proof thus generated is an accurate representation of the colors of a printed color document and an image structure such as moiré, a rosette image, or the like (false pattern).

A print sheet of paper on which a color image is formed suffers various types of appearance irregularity. Such visual irregular qualities of paper include "impression irregularity" that is visually recognized as a randomly changing density pattern on a reproduced image which is printed on a print sheet when ink is transferred from a uniform image on a press plate to the print sheet, "harshness" that is visually recognized as a smaller randomly changing density pattern which tends to disturb the edges of a reproduced image which is printed on a print sheet, and "texture" that is visually recognized as a density pattern inherent in the type of paper used as a print sheet. The density pattern "impression irregularity" appears in a longer period than the density pattern "harshness".

The above visual irregular qualities of paper are not taken into account in the DP or the like, and are not reproduced at all on a proof which is outputted from the DP or the like.

One technique for expressing a visual irregular quality uses a transfer film which is being sold as a product by the applicant of the present application. According to this technique, a halftone-dot image formed on a transfer film is transferred under pressure to a print sheet. Although the technique is capable of reproducing "texture" of all the three types of appearance irregularity, it is unable to reproduce the other visual irregular qualities "impression irregularity" and "harshness" which result from the transfer of ink from a press plate to a print sheet of paper.

SUMMARY OF THE INVENTION

It is an object of the present invention to provide a method of generating proof data to reproduce accurately a peculiar pattern such as moiré, a rosette image, or the like which will appear on a printed color document of high resolution, with an image output device such as a color printer or the like which is relatively inexpensive to manufacture and has a relatively low level of resolution.

Another object of the present invention is to provide a method of generating a proof to reproduce accurately visual irregular qualities of paper on the proof with an image output device such as a color printer or the like which is relatively inexpensive to manufacture and has a relatively low level of resolution.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a diagram showing the matrix structure of an anti-aliasing filter;

FIGS. 10A through 10C are diagrams showing generated histograms;

FIGS. 10D through 10F are diagrams showing cumulative histograms generated respectively from the histograms shown in FIGS. 10A through 10C;

FIG. 13 is a diagram showing coefficients in an upper left portion of the Gaussian filter shown in FIG. 12;

FIG. 18 is a diagram illustrative of a dispersive field before the contrast of a rosette pattern is emphasized;

FIG. 21 is a diagram showing average random rates of change of the halftone-dot area percentage which have been obtained from experimental results based on microscopic observations;

DETAILED DESCRIPTION OF THE PREFERRED EMBODIMENTS

Figure 1:
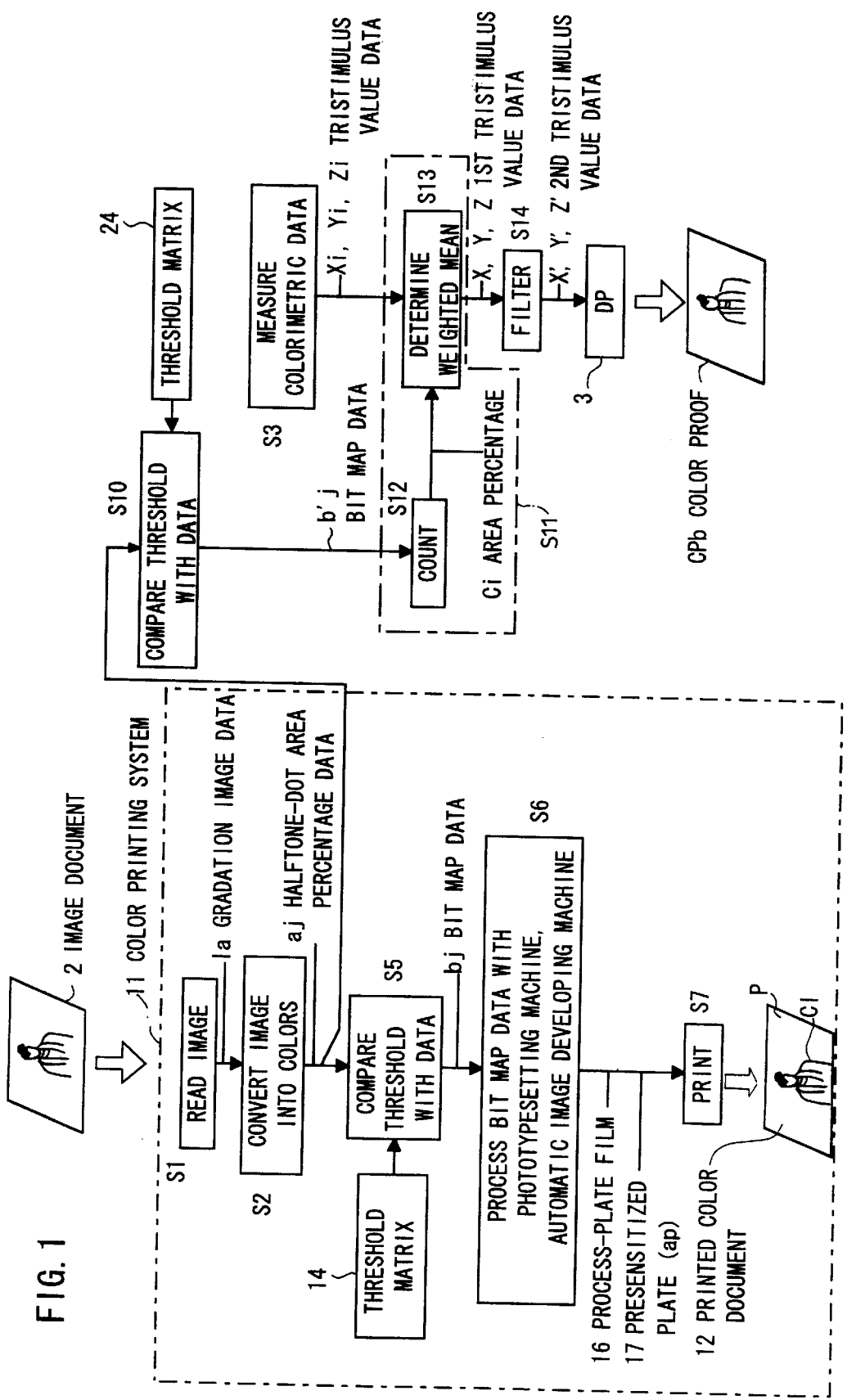
FIG. 1 is a flowchart of a process of operation of a system for producing a color proof with respect to a printed color document, the process including a processing sequence as a basis of the present invention.

A method of generating color proof data and a method of generating a color proof according to the present invention will be described below with reference to the accompanying drawings. Those parts or steps shown in FIGS. 1 through 26 which are identical to those shown in FIG. 27 are denoted by identical reference characters, and will not be described in detail below.

The description which follows successively covers the following topics in the order named:

A. General color printing system for generating a printed color document with a color printer;

B. Idea as a basis for the present invention, as disclosed in Japanese laid-open patent publication No. 8-192540; and C. Embodiments of the present invention.

A. General Color Printing System for Generating a Printed Color Document with a Color Printer FIG. 1 is a flowchart of a process of producing a color proof CPb with a color digital printer (DP) 3 with respect to a printed color document 12 which is generated by a general color printing system 11.

The general color printing system 11 will first be described below.

In the general color printing system 11, an image on an image document 2 is read by an image reader such as a color scanner having a CCD linear image sensor, a CCD area image sensor, or the like, and gradation image data Ia of each of the colors R (red), G (green), and B (blue) are generated from the read image in a step S1 (image reading process). The image sensor such as a CCD linear image sensor or the like has a resolution (first resolution) Re1 which may be selected to be of 400 DPI (Dots Per Inch), for example. One dot corresponds to one pixel according to a density gradation process (continuous tone process) with 256 gradations or the like.

The pixel data of the gradation image data Ia of RGB are then converted by a color conversion process using a color conversion look-up table or the like into halftone-dot area percentage data (also referred to as halftone-dot percentage data or original image pixel halftone-dot percentage data) aj of the four plates of respective colors C (cyan), M (magenta), Y (yellow), and K (black) in a step S2 (color conversion process). The color conversion process has various versions depending on different color printing machines, as described later on, and those versions are based on know-hows of various printing companies depending on their color printing machines.

For example, values of halftone-dot area percentage data (also referred to as halftone-dot percentage data or simply halftone-dot area percentage) ap on presensitized plates 17 installed as press plates in a color printing machine are usually not in agreement with values of the halftone-dot area percentage data aj. However, if consideration is given mainly to the color printing machine, then the halftone-dot area percentage data ap on the presensitized plates 17 are important. For an easier understanding, it is assumed in this embodiment that the color-converted halftone-dot area percentage data aj and the halftone-dot area percentage data ap on the presensitized plates 17 are equal to each other (aj=ap).

Actually, various values of the relationship between the halftone-dot area percentage data aj and the halftone-dot area percentage data ap on the presensitized plates 17 (e.g., average values of the halftone-dot area percentage data of the four colors C, M, Y, K) are measured, and the measured values are stored in a look-up table or as a calculation formula. Using the loop-up table or the calculation formula, halftone-dot area percentage data aj for obtaining desired halftone-dot area percentage data ap on the presensitized plates 17 are determined.

If no UCR (Under-Color Removal) process is carried out in the color conversion process in the step S2, then the gradation image data Ia of RGB may be converted into halftone-dot area percentage data aj of the three plates of colors C, M, Y. If the color Y is not present on the printed color document 12, then the gradation image data Ia of RGB may be converted into halftone-dot area percentage data aj of the two plates of colors C, M.

After the step S2, four threshold matrixes (also called "threshold templates" or halftone-dot templates") 14 having a resolution (second resolution) Re2 of Re2=about 2000 DPI (in the illustrated embodiment, a resolution Re2=1600 DPI for an easier understanding) and a desired screen angle and screen ruling with respect to each of the four plates C, M, Y, K are referred to for comparing each threshold of each element of the threshold matrixes 14 with the values of the halftone-dot area percentage data aj generated per pixel for the four plates C, M, Y, K, with a comparator (not shown), thereby converting the values of the halftone-dot area percentage data aj into binary data having a value of "0" or "1", i.e., bit map data bj, in a step S5 (comparison process). The screen angles of the threshold matrix 14 for the plate Y and the threshold matrix 14 for the plate M, for example, have an angle difference of 45° or the like. Actually, the screen angles of the threshold matrix 14 for the plates M, C, K have angle differences of 75°, 45°, 15°, respectively, with respect to a reference (0°) which is provided by the plate Y. The screen ruling is 175 in this embodiment.

Figure 2:
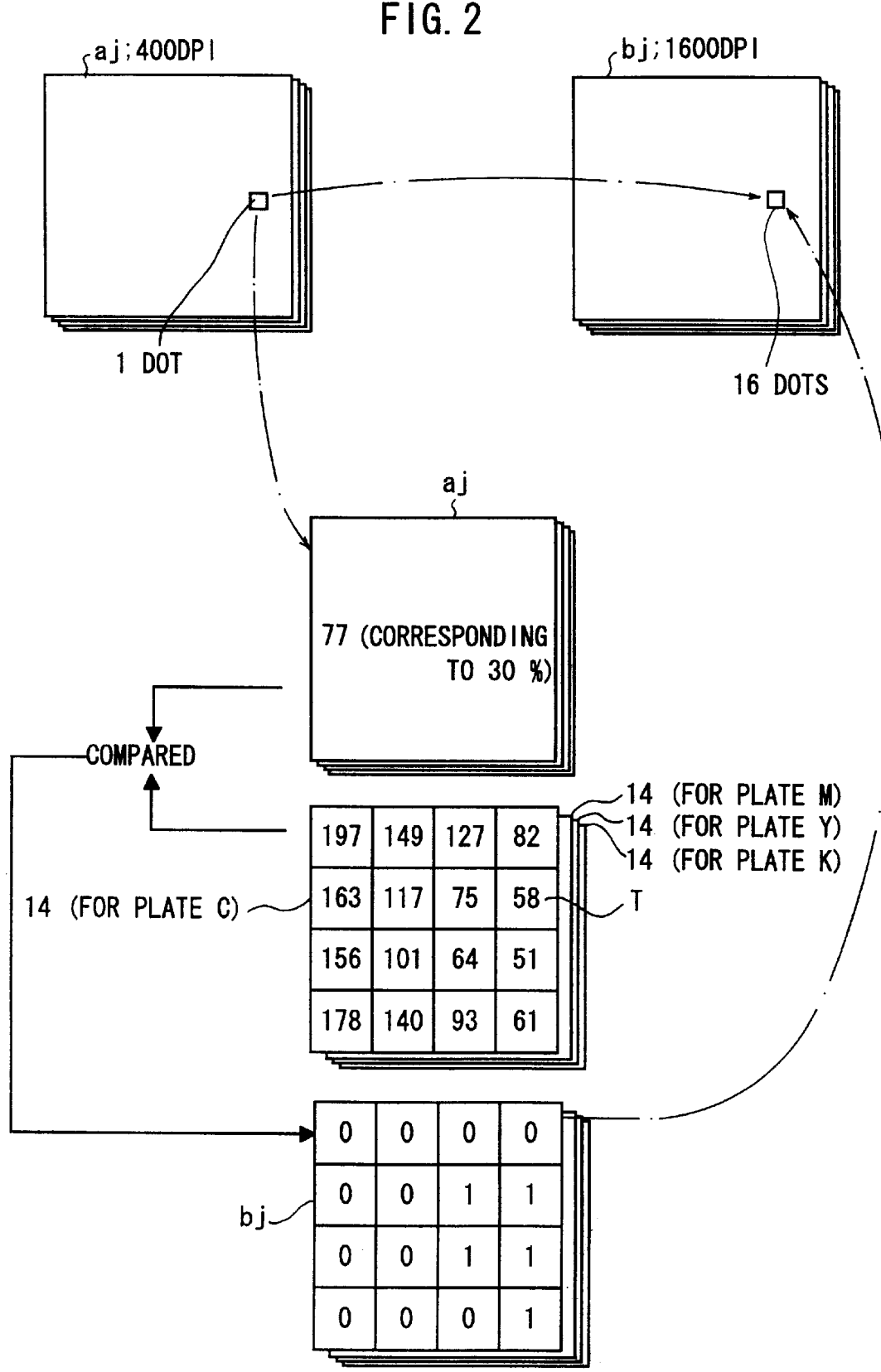
FIG. 2 is a diagram illustrative of the generation of general bit map data for producing a printed color document, in the process shown in FIG. 1.

FIG. 2 schematically shows the threshold matrixes 14, etc. for illustrating in detail the comparison process (the generation of bit map data) in the step S5.

In FIG. 2, a process shown between two uppermost blocks illustrates a conversion from one dot of halftone-dot area percentage data aj of 400 DPI into 16 dots of bit map data bj of 1600 DPI.

If one dot of halftone-dot area percentage data aj belongs to the plate C, for example, and the value of the halftone-dot area percentage data aj is represented as aj=77 (which corresponds to 30%, but is usually represented as a gradation value such as of 77 for comparison), then it is compared with the threshold matrix 14 for the plate C. The threshold matrix 14 is composed of thresholds T arranged in a convolutional pattern in the matrix elements, as shown in FIG. 2. While the threshold matrix 14 will not be described in detail as it has no direct bearing on the present invention, the threshold matrix 14 is hypothetically established, and is reconstructed from extracted corresponding portions of either thresholds corresponding to one halftone dot where thresholds T of 8-bit gradations of 0, 1, 2, . . . , 254, 255 are arranged in a convolutional pattern from the center, or a supercell (e.g., one threshold corresponding to nine halftone dots).

In FIG. 2, as is well known in the art, the generation of bit map data bj, i.e., the conversion of the values of the halftone-dot area percentage data aj into binary data, is carried out according to the following formulas (3), (4):

$$aj \geq T \rightarrow 1 \text{ (blackened)} \quad (3)$$

$$aj < T \rightarrow 0 \text{ (blackened)} \quad (4)$$

In this manner, the bit map data bj corresponding to the pixel of the plate C, i.e., the pixel whose halftone-dot area percentage data aj is aj=30%), shown in a lowermost block in FIG. 2, are generated. As described above, the threshold matrixes 14 for the plates M, Y, K have respective screen angles selectable with respect to the threshold matrix 14 for the plate C.

The bit map data bj are then processed by a phototypesetting machine, an automatic image developing machine, etc. in a step S6 (plate production process, FIG. 1), producing four process-plate films 16 having halftone dot images as block copies and presensitized plates 17 as printing plates.

Finally, using the presensitized plates 17, a printed color document 12 composed of a halftone dot image is produced by a color printing machine having rotary presses in a step S7 (printing process).

The printed color document 12 has a halftone dot image CI which has been formed on a print sheet P by inks transferred from the presensitized plates 17. The halftone dot image CI of the printed color document 12 contains a peculiar pattern such as moiré, a rosette image, or the like which does not appear on the image document 2 and which is caused by the threshold matrixes 14 having different screen angles. In addition, the halftone dot image CI also contains various density patterns based on the various types of appearance irregularity of the print sheet P, which include, as described above, "impression irregularity" that is visually recognized as a periodic density pattern of a relatively long period, "harshness" that is visually recognized as a randomly periodic density pattern of a relatively short period which is produced on the reproduced image and tends to disturb the edges of the reproduced image, and "texture" that is visually recognized as a density pattern inherent in the type of paper used as the print sheet P.

B. Idea as a Basis for the Present Invention, as Disclosed in Japanese Laid-open Patent Publication No. 8-192540

For an easier understanding of the invention disclosed in Japanese laid-open patent publication No. 8-192540, an anti-aliasing filtering process in a step S14 will first be described below.

The anti-aliasing filtering process in the step S14 is inserted to avoid, in advance, aliasing noise which would be introduced due to a resolution (third resolution or output resolution) Re3 of the DP 3 when the color proof CPb is to be generated with the resolution Re3 (Re3=400 DPI in this embodiment) of the DP 3. For effectively carrying out the anti-aliasing filtering process, it is necessary that a resolution (fifth resolution) Re5 of the image data which are an original signal to be processed by the anti-aliasing filter be higher than the resolution Re3 (=400 DPI) of the DP 3. In this embodiment, the resolution (also referred to as intermediate resolution) Re5 of the image data to be processed by the anti-aliasing filter AF is set to 1600 DPI.

The structure of a matrix (a square matrix of n×n elements) of the anti-aliasing filter will be analyzed below.

For converting image data having a resolution of 1600 DPI (=Re5) into image data having a resolution of 400 DPI (=Re3), since one dot (one pixel) of 400 DPI corresponds to 16 dots (four pixels×four pixels) of 1600 DPI, the minimum number of elements of a filter with no anti-aliasing capability is 4×4.

To minimize aliasing noise, the number of elements of the anti-aliasing filter should preferably be as large as possible, but is limited by the operating speed, hardware, etc. thereof.

As can be analogized from the fact that color information can be reproduced by the Neugebauer's equation, the anti-aliasing filter is required to have such frequency characteristics that it will produce as small an insertion loss as possible in the vicinity of DC components because it is necessary for the anti-aliasing filter to pass components of relative low frequencies including DC components. Therefore, the response of the anti-aliasing filter at the center of the matrix should ideally be 0 dB.

An interference fringe component such as of moiré, i.e., a component which is equal to or less than the screen frequency (screen ruling) component, should remain unremoved in its entirety after the anti-aliasing filtering process.

The anti-aliasing filter should be designed also in view of the fact that if the attenuation curve of the anti-aliasing filter is sharp, then a new peculiar pattern will appear due to the anti-aliasing filtering process.

FIG. 3 shows the structure of an anti-aliasing filter AF which is composed of 9×9 elements designed in view of the above considerations. If the elements are represented by "dij", then the sum of the values (also called filter coefficients) of the respective elements dij need to be 1.0. Therefore, the actual value of each of the elements dij is divided by the sum ($\Sigma$dij) of elements dij. The filter coefficients of the anti-aliasing filter AF thus constructed are arranged such that, as shown in FIG. 3, its frequency characteristics provide a bell-shaped attenuation pattern which is monotonously reduced from the center toward the outer edges.

Figure 4:
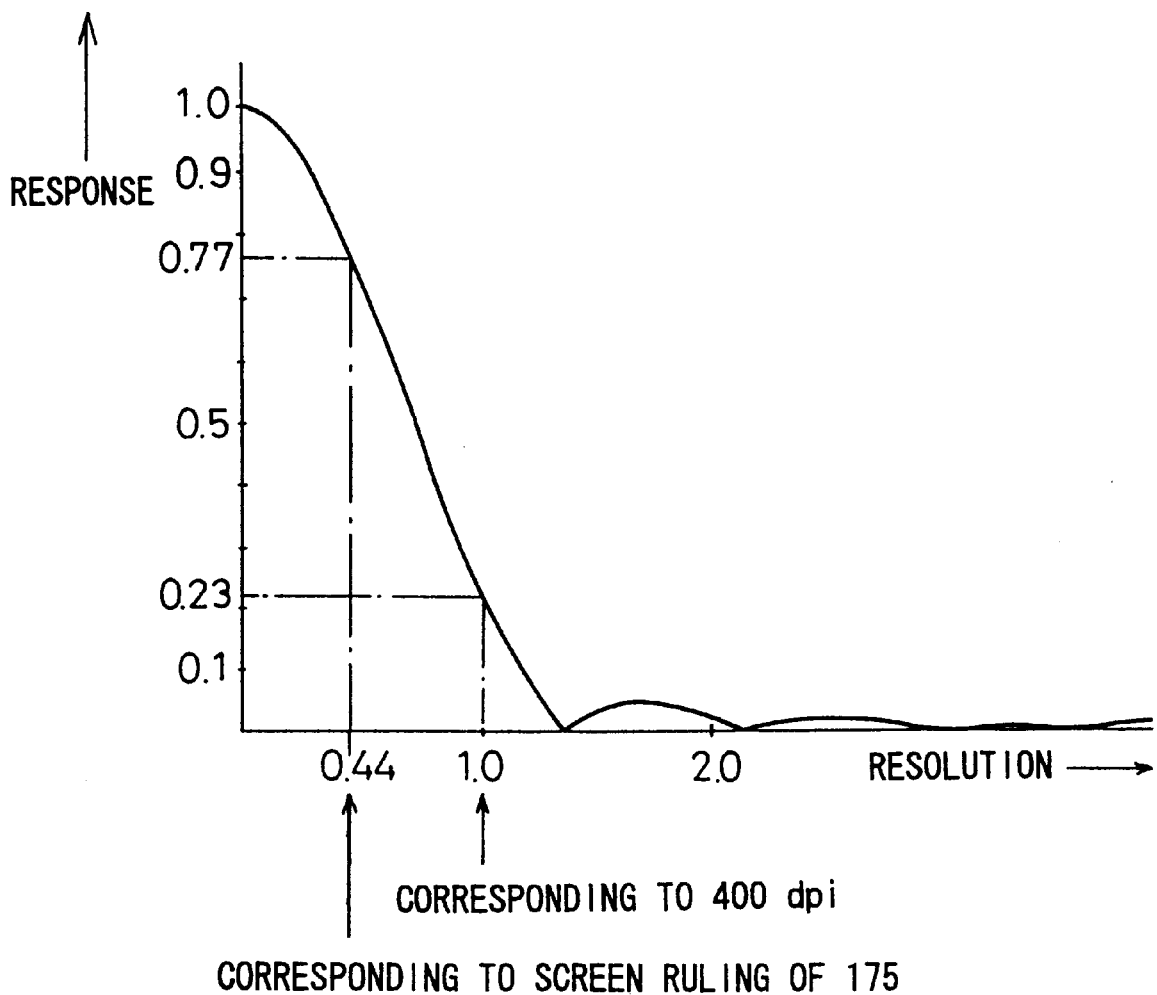
FIG. 4 is a diagram showing the frequency response of the anti-aliasing filter.

FIG. 4 shows the frequency characteristics of the anti-aliasing filter AF. In FIG. 4, the horizontal axis represents the resolution of the anti-aliasing filter AF with a value of 1.0 standardized by the resolution Re3=400 DPI of the DP 3. The screen ruling of 175 which is the screen frequency is standardized at a value of 0.44 (175/400). The vertical axis in FIG. 4 represents the response of the anti-aliasing filter AF with a central element $d_{55}=121$ being standardized at a value of 1.0

It can be seen from FIG. 4 that the anti-aliasing filter AF shown in FIG. 3 has a response of about 0.23 at the resolution of 1.0, and a response of about 0.77 at the resolution of 0.44.

As a result of an analysis of various examples, it has been understood that if the response is 0.5 (50%) or more when the resolution is equal to the screen frequency (corresponding to the screen ruling) and if the response is 0.3 (30%) or less when the resolution is equal to the resolution of 1.0 of the color digital printer (DP) 3, then a peculiar pattern such as moiré or the like appearing on the printed color document 12 can be reproduced on the color proof CPb, and any aliasing noise can be made small enough not to be visually recognized.

The structure of the matrix (the square matrix of n×n (9×9) elements) of the anti-aliasing filter AF has been described above.

The image data produced after the anti-aliasing filtering process in the step S14 are image data having a resolution of 400 DPI (=Re3) in a common color space (device-independent image data), e.g., tristimulus value data (referred to as second tristimulus value data) X', Y', Z'.

The image data to be processed by the anti-aliasing filtering process (the tristimulus value data X, Y, Z) have a resolution selected to be of 1600 DPI. One dot of these image data is not of binary data, but of image data in the common color space, e.g., the tristimulus value data (first tristimulus value data) X, Y, Z.

In order to generate the first tristimulus value data X, Y, Z without using the Neugebauer's equation, the halftone-dot area percentage data aj produced in the color conversion process in the step S2 and thresholds of threshold matrixes (also referred to as "threshold templates" or "halftone-dot templates") 24 are compared with each other by a comparator (not shown), thus converting the halftone-dot area percentage data aj into bit map data b'j which are binary data having a resolution higher than the bit map data bj (=1600 DPI) in a step S10.

The screen ruling relative to the threshold matrixes 24 is required to be same screen ruling for printing so as to reproduce moiré or the like. Here, the screen ruling is set to 175. In order to increase the resolution, the threshold matrixes 24 for generating halftone dots have 256×256=65536 elements. The threshold T in each of the elements may take either one of values ranging from 0 to 255, for example.

The bit map data b'j for the plates C, M, Y, K have a resolution (fourth resolution) Re4 of 44800 (256×175) DPI.

For converting the bit map data b'j of 44800 DPI into the first tristimulus value data X, Y, Z having the resolution Re5 of 1600 DPI, 28×28 dots of the bit map data b'j may be converted into one dot of the first tristimulus value data X, Y, Z. A data processor (step S11) is provided to effect such data conversion.

Figure 5A:
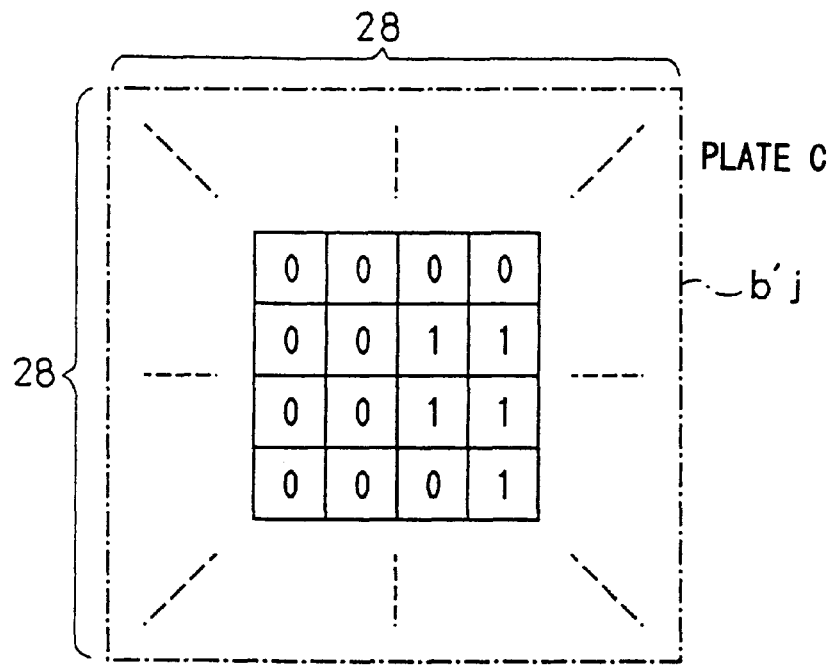
FIGS. 5A and 5B are diagrams illustrating the manner in which average colorimetric data are generated from bit map data of relatively high resolution in the generation of a color proof in the process shown in FIG. 1, FIG. 5A showing bit map data of the color C for 28×28 dots, and FIG. 5B showing bit map data of the color M for 28×28 dots
Figure 5B:
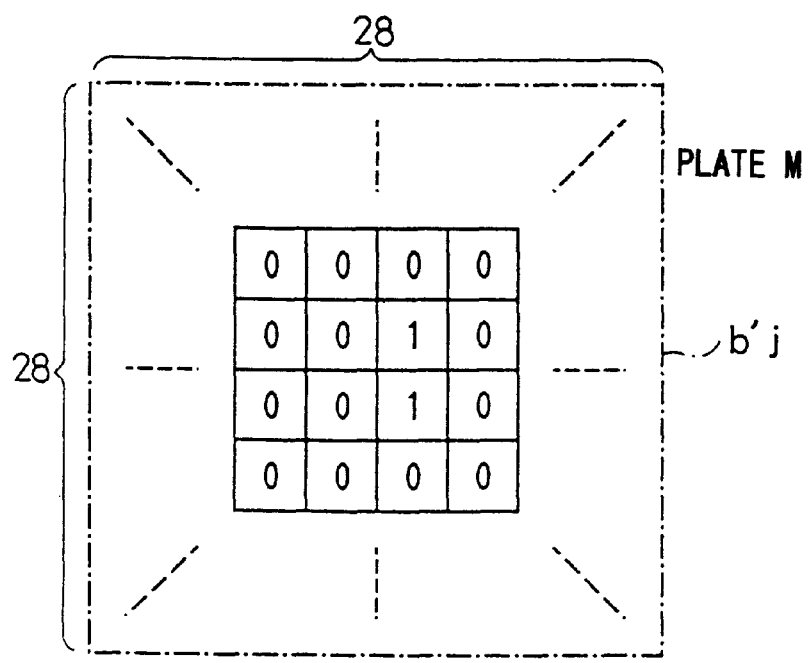

For illustrating the step S11, 28×28 dots of the bit map data b'j for the plate C are shown in FIG. 5A, and 28×28 dots of the bit map data b'j for the plate M are shown in FIG. 5B. It is assumed that all non-illustrated elements in FIGS. 5A and 5B have a value of "0" and all elements of the remaining bit map data b'j for the plates Y, K also have a value of "0".

With respect to the 28×28 dots, the bit map data b'j for the four plates C, M, Y, K (in this example, the bit map data b'j for the two plates C, M) are simultaneously referred to, and area percentages ci for the respective colors, i.e., the 24 colors because there are four plates, are counted in a step S12 (counting process).

For the pixels (corresponding to 28×28 dots) shown in FIGS. 5A and 5B, the area percentages ci for the respective colors are calculated as follows:

Color C; $ci=c_c=3/784$ (The area percentage $c_C$ represents an area where only the color C is present when the plates C, M are superposed and viewed in a transmissive manner, and an area where the colors C, M are superposed is represented by the area percentage $c_{C+M}$ of the color C+M=B.)

Color C+M; $c_{C+M}=2/784$

Color W; $c_W=779/784$ (This area percentage represents an area where neither the color C nor the color M is present when the plates C, M are superposed and viewed in a transmissive manner.)

The area percentage ci of remaining colors (13 colors such as the colors Y, K, etc.) is nil. In this manner, the first tristimulus value data X, Y, Z of 1600 DPI are generated.

Then, the colorimetric data Xi, Yi, Zi (i represents $2^4=16$ colors for the four plates C, M, Y, K) of each of the 16 solid colors printed on the printed color document 12, which have been measured by the calorimeter in the step S3, are processed into average colorimetric data as first tristimulus value data X, Y, Z by a weighted-mean generator using the area percentages ci for the respective colors counted in the step S12 as a weighting coefficient, according to the equation (5) given below in a step S13. Stated otherwise, the weighted mean of the colorimetric data Xi, Yi, Zi is calculated with the area percentages ci for the respective colors, thus determining the first tristimulus value data X, Y, Z.

$X=\Sigma ci \cdot Xi=(3/784)X_C+(2/784)X_{C+M}+(779/784)X_W$ $Y=\Sigma ci \cdot Yi=(3/784)Y_C+(2/784)Y_{C+M}+(779/784)Y_W$ $Z=\Sigma ci \cdot Zi=(3/784)Z_C+(2/784)Z_{C+M}+(779/784)Z_W$ (5)

When the counting process in the step S12 and the weighted-mean determining process in the step S13 for each group of 784 (28×28) dots are carried out in the full range of the bit map data b'j of 44800 DPI, the first tristimulus value data X, Y, Z of 1600 DPI are obtained.

Then, the obtained the first tristimulus value data X, Y, Z of 1600 DPI are processed by the above anti-aliasing filtering process using the anti-aliasing filter AF into the second tristimulus value data X', Y', Z' of 400 DPI which is equal to the resolution of the DP 3 after the anti-aliasing filtering process in the step S14.

Figure 6A:
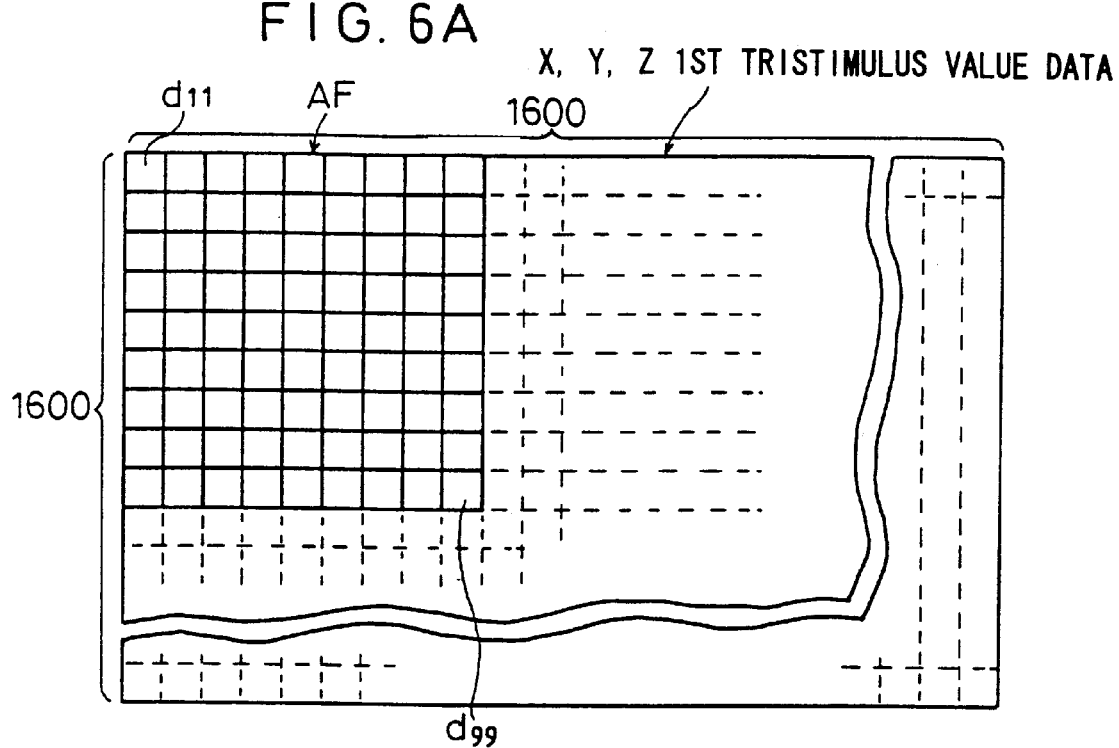
FIGS. 6A and 6B are diagrams illustrative of the manner in which the average colorimetric data are processed by the anti-aliasing filter, FIG. 6A showing a initial processing stage, and FIG. 6B showing a next processing stage.
Figure 6B:
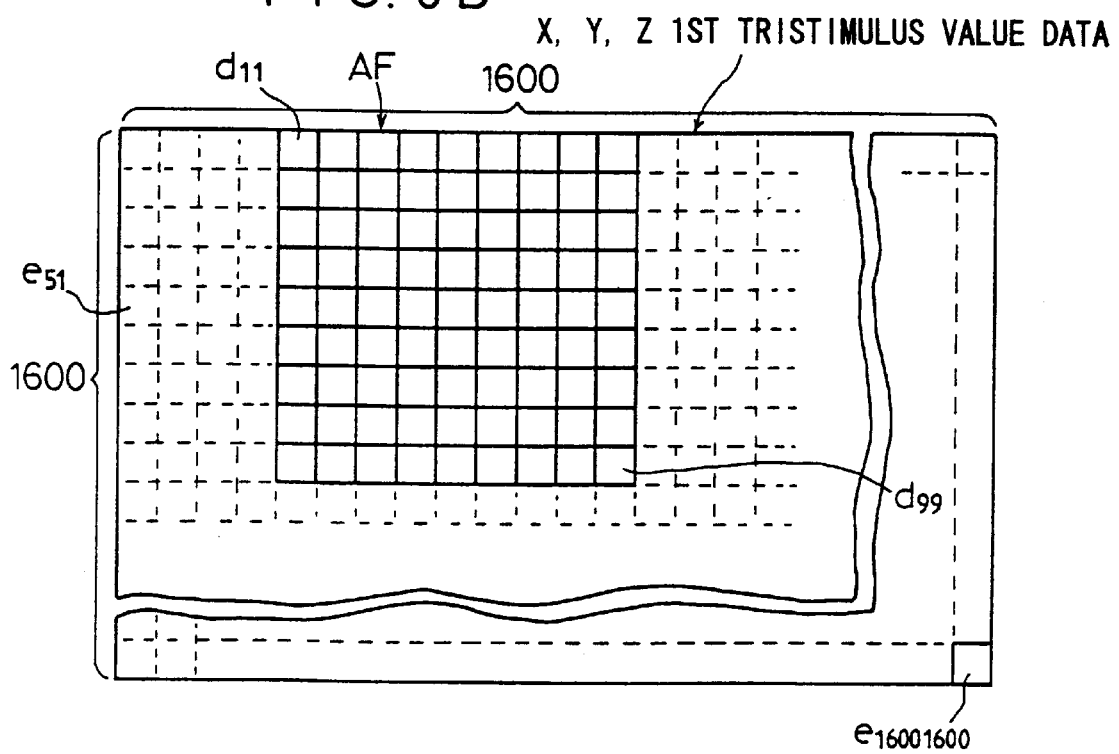
Figure 9:
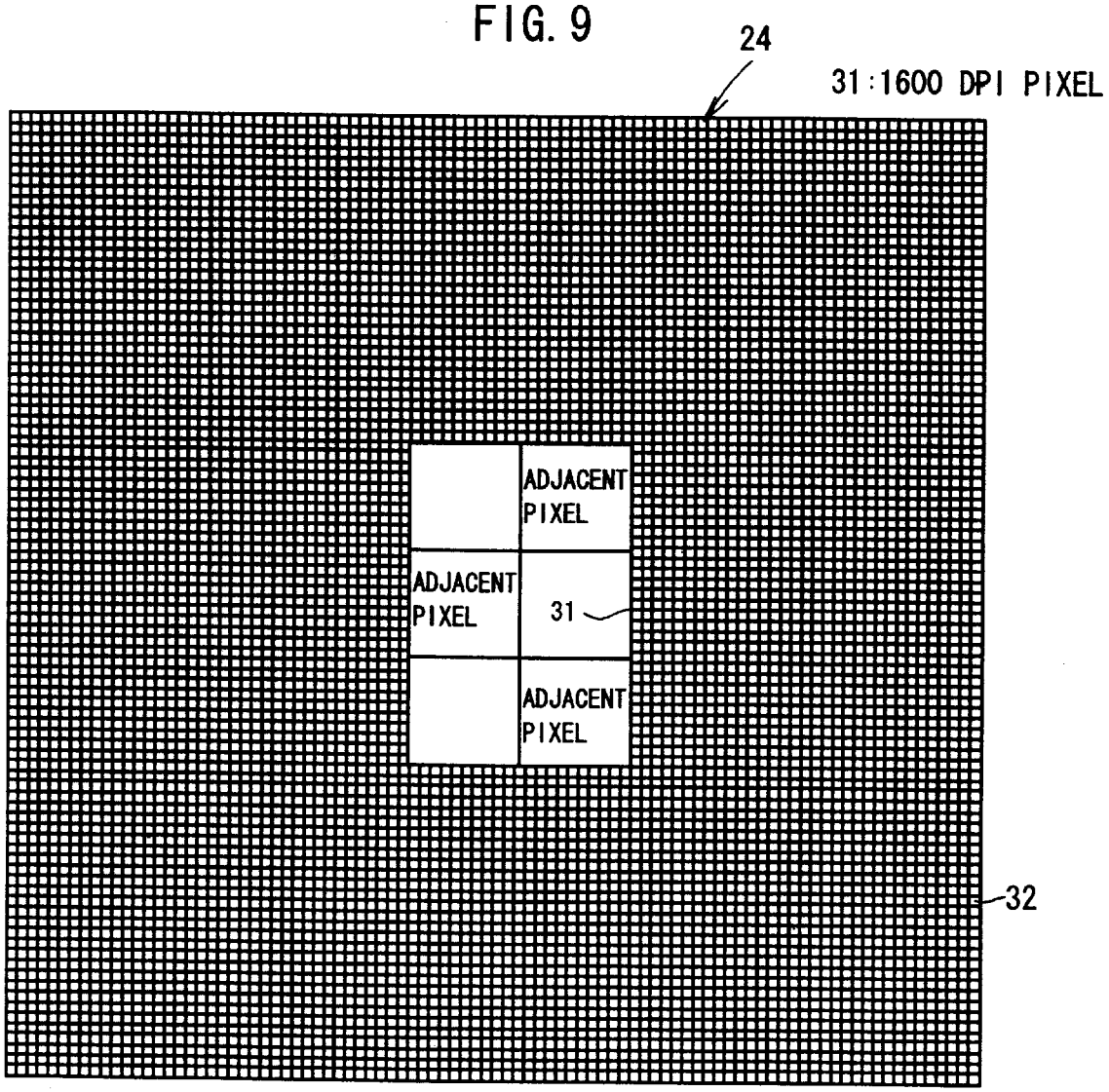
FIG. 9 is a diagram illustrative of the generation of a cumulative histogram from a threshold matrix.

FIGS. 6A and 6B are illustrative of the manner in which the first tristimulus value data X, Y, Z are processed by the anti-aliasing filter AF. As shown in FIG. 6A, 9×9 dots in an upper left portion of the first tristimulus value data X, Y, Z of 1600 DPI are associated with the anti-aliasing filter AF of the 9×9 matrix whose elements are represented by dij as shown in FIG. 3, and the corresponding elements are multiplied, after which the sum of the products is determined. In this manner, the anti-aliasing filtering process is carried out. More specifically, if each of the elements of the first tristimulus value data X, Y, Z is represented by eij (for each of the data X, Y, Z), then $\Sigma(dij \times eij)$ is calculated with respect to each of the first tristimulus value data X, Y, Z, and used as the second tristimulus value data X', Y', Z' having a resolution of 400 DPI. While the sum of the anti-aliasing filter AF is standardized at $\Sigma dij=1$ as described above, since multiplications involving decimal fractions are time-consuming, the values shown in FIG. 3 may be used as the values of the elements of the anti-aliasing filter AF, which are then represented by d'ij, and $\Sigma(d'ij \times eij)/\Sigma d'ij$ may be determined as a value produced as a result of the anti-aliasing filtering process.

Because the anti-aliasing filtering process converts the first tristimulus value data X, Y, Z of 1600 DPI into the second tristimulus value data X', Y', Z' of 400 DPI, a second anti-aliasing filtering process on the first tristimulus value data X, Y, Z may be carried out by shifting the anti-aliasing filter AF by 4 dots of the first tristimulus value data X, Y, Z to the right, for example, as shown in FIG. 6B. Similarly, the anti-aliasing filtering process is successively effected by shifting the anti-aliasing filter AF by 4 dots. After the anti-aliasing filtering process is carried out in a position equal to the right-hand end of the first tristimulus value data X, Y, Z, a fifth element $e_{51}$ from above shown in FIG. 6B is associated with an element $d_{11}$ of the anti-aliasing filter AF, and then the anti-aliasing filtering process is successively effected by shifting the anti-aliasing filter AF by 4 dots until an element $e_{1600\,1600}$ is associated with an element $d_{99}$. In this fashion, the first tristimulus value data X, Y, Z of 1600 DPI can be converted into the second tristimulus value data X', Y', Z' of 400 DPI with its resolution reduced from the resolution of the first tristimulus value data X, Y, Z.

The second tristimulus value data X', Y', Z' thus generated after the counting process and the anti-aliasing filtering process are supplied to the DP3. The DP3 then converts the new second tristimulus value data X', Y', Z', i.e., common color space data, into pixel data for the three primaries relative to LEDs or the like, stated otherwise, into inherent color space data using look-up tables (LUTs) or the like. Thereafter, the DP 3 generates a color proof CPb which is a hard copy with a color image formed on a print sheet. The LUTs, which serve as converting means (conversion tables) for converting common color space data into inherent color space data, may be disposed externally to the DP 3.

Figure 7:
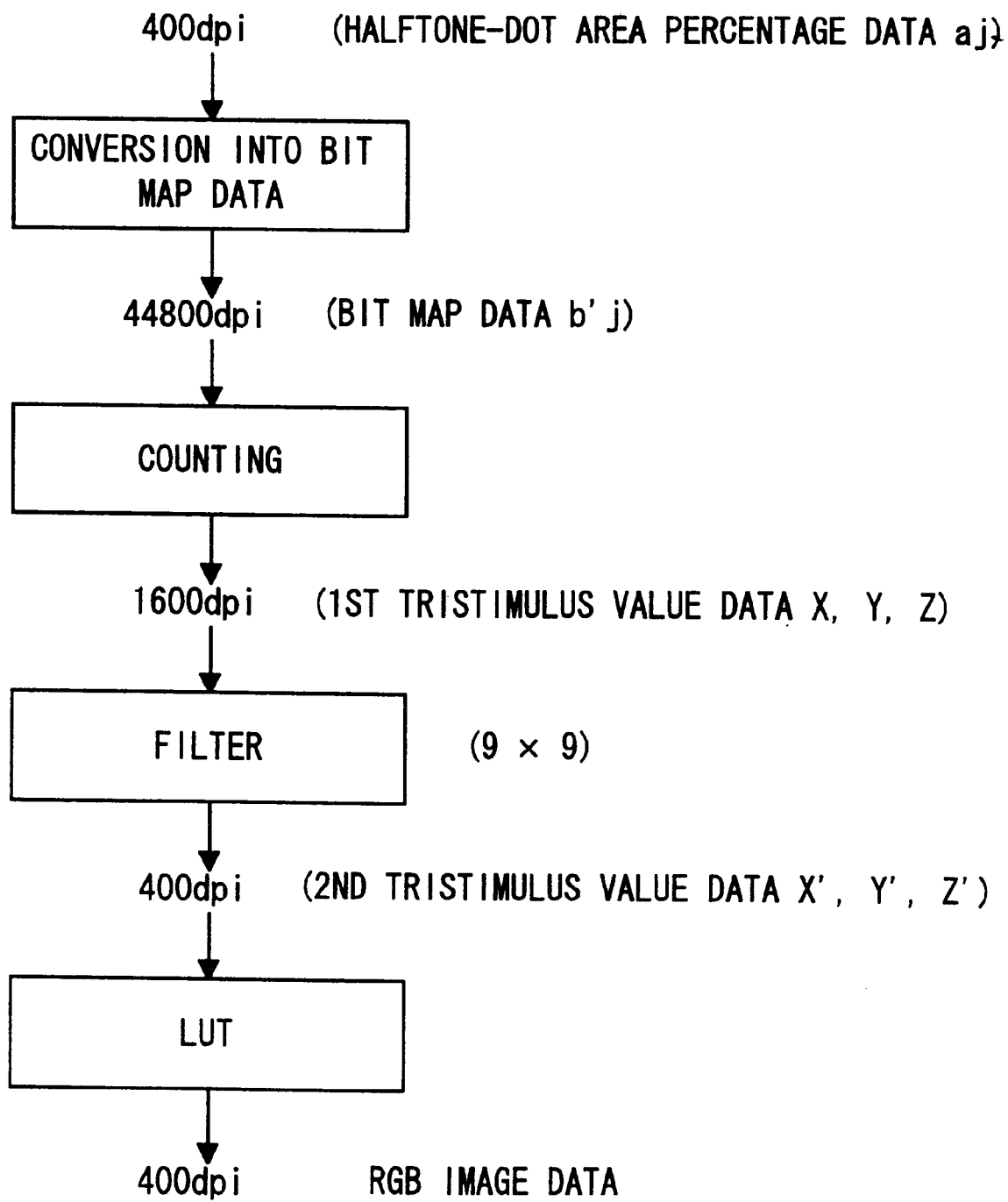
FIG. 7 is a diagram illustrative of a resolution conversion process as a basis of the present invention.

According to the above processing sequence which serves as a basis of the present invention, as summed up in FIG. 7, the halftone-dot area percentage data aj produced from the image document 2 and having a resolution of 400 DPI for at least three plates including the three primaries are converted into respective bit map data b'j by referring to the threshold matrixes 24 having a resolution of 44800 DPI which is higher than the resolution of 1600 DPI of the printed color document 12 on which a halftone-dot image is formed. Then, the bit map data b'j are simultaneously referred to, and the area percentage ci of each of the colors ($2^n$ colors when the number of plates is n) in each range (28×28 dots) of the bit map data b'j. Then, the first tristimulus value data X, Y, Z having a resolution of 400 DPI, i.e., the average colorimetric data, are calculated using as a weighting coefficient the area percentages ci which have been counted with respect to the colorimetric data Xi, Yi, Zi that have been determined in advance for the respective colors. The calculated first tristimulus value data X, Y, Z are processed by the anti-aliasing filter AF having a size of 9×9 dots which is greater than the pixels of the DP 3 while the anti-aliasing filter AF is being successively shifted by 4 dots, so that the first tristimulus value data X, Y, Z are converted into second tristimulus value data X', Y', Z' which correspond to the pixels of the DP 3 which has a resolution of 400 DPI. The second tristimulus value data X', Y', Z' are converted into RGB image data which are inherent color space data of the DP 3, using LUTs or the like. The RGB image data are used as pixel data for the DP 3.

An image on a hard copy which is generated by the DP 3 based on the pixel data thus generated, i.e., the color proof CPb, has colors in conformity with those on the printed color document 12 and reproduces a peculiar pattern which appears in a halftone-dot image. Specifically, the color proof CPb reproduces thereon a peculiar pattern such as moiré, a rosette image, or the like which is substantially equal to the peculiar pattern that appears on the printed color document 12.

Though the resolution of the DP 3 is of a relatively small value of 400 DPI, the DP 3 is capable of reproducing on the color proof CPb a peculiar pattern such as moiré, a rosette image, or the like which is substantially equal to the peculiar pattern that appears on the printed color document 12 which is generated by the color printing machine having a resolution of 2000 DPI (which is assumed to be 1600 DPI in this embodiment). Since the first tristimulus value data X, Y, Z are processed by the anti-aliasing filtering process, it is possible to remove aliasing noise (also called a peculiar pattern due to a beat on an image) produced due to the resolution of the DP 3, stated otherwise, a false image structure based on an interference between a halftone-dot period due to the use of the DP 3 and the resolution of the printer (the resolution of the DP 3).

Therefore, the system shown in FIG. 1 is capable of generating a color proof CPb containing a peculiar pattern appearing on the printed color document 12, inexpensively with a simple arrangement. Because the colorimetric data Xi, Yi, Zi are employed, the color proof CPb can accurately reproduce the colors of the printed color document 12.

In the above embodiment, the first and second tristimulus value data X, Y, Z and X', Y', Z' which are the average colorimetric data are generated using the colorimetric data Xi, Yi, Zi. However, the average colorimetric data may be generated using chromaticity data or density data instead of the colorimetric data Xi, Yi, Zi. The average colorimetric data in the common color space may thus be generated using data measured in a color space (common color space) which is independent of devices.

A color proof can be generated according to the present invention even if an FM screen where halftone dots are randomly arranged is used as the threshold matrixes 14, 24.

An image on a color proof CPb generated by the DP 3 ("PICTROGRAPHY 3000" manufactured by Fuji Photo Film Co., Ltd.) using the Neugebauer's equation, an image on a print sheet generated by a color printing machine, and an image on a color proof CPb generated by the DP 3 according to the above embodiment were compared with each other. The image on the color proof CPb generated by the DP 3 according to the basis for the present invention was capable of accurately reproducing a peculiar pattern such as moiré, a rosette image, or the like which appears in the image on the printed color document 12 generated by the color printing machine, and was closer to the image on the print sheet generated by the color printing machine than the image on the color proof CPb generated by the DP 3 using the Neugebauer's equation, with respect to harshness and jumps. The printed color document 12 used for comparison had a screen ruling of 175, and the four plates C, M, Y, K had respective screen angles of 75°, 45°, 0°, 15°, respectively, as described above.

C. Embodiments of the Present Invention

The process of developing the halftone-dot area percentage data aj into bit map data b'j (also referred to as a halftone-dot development process) in the step S10 and the data processing process in the next step S11 shown in FIG. 1 are referred collectively to as a microscopic color prediction process. The microscopic color prediction process is a process of determining the first tristimulus value data X, Y, Z of a pixel having an intermediate resolution Re5 of 1600 DPI (also referred to as an intermediate-resolution pixel) having a size {e.g., 15.9 (25400 $\mu$m/1600 DPI) $\mu$m×15.9 $\mu$m} which is a fraction of the size {63.5 (25400 $\mu$m/400 DPI) $\mu$m×63.5 $\mu$m} of a pixel having a resolution equal to the resolution Re3 (=400 DPI) of the DP 3 (also referred to as a resolution pixel).

Specifically, in order to determine the first tristimulus value data X, Y, Z, the intermediate-resolution pixel is divided into 28×28 dots (see FIGS. 5A and 5B) composed of smaller minute areas [one dot of the resolution Re4 (=44800 DPI) {the dot has a size of 0.567 (25400 $\mu$m/44800 DPI) $\mu$m×0.567 $\mu$m}], and it is determined which one of the 16 primaries is represented by each of the smaller minute areas. The points of the 16 primaries are counted for each intermediate-resolution pixel (the counting process in the step S12), and weighted mean values of the tristimulus value data Xi, Yi, Zi of the 16 primaries which have been measured in advance are determined using the number of the counted points as a weighting value, thereby determining the first tristimulus value data X, Y, Z. If the area percentage ci, i.e., the existential probability, of each of the 16 primaries is represented by Pi, then the first tristimulus value data X, Y, Z can be determined according to the following equation (6) which corresponds to the above equation (5):

$$X = \Sigma(Pi \times Xi), \quad (i=1\sim16) \tag{6}$$

Y, Z are similarly expressed.

It can be determined which one of the 16 primaries is represented by each of the smaller minute areas simply by comparing the thresholds T of the threshold matrixes 24 and the values of the halftone-dot area percentage data aj of the plates C, M, Y, K, as described above with respect to the comparison process in the step S10. For maintaining the accuracy of the colors of the intermediate-resolution pixels, it takes a long period of time to effect calculations because the number of smaller minute areas is very large, e.g., 28×28 dots. The inventor has devised a simple process using a cumulative histogram in order to solve the above problem.

According to the devised simple process, the existential probability (also referred to as halftone-dot existential probability) Pi of each intermediate-resolution pixel is determined by a probabilistic approximating method like the Neugebauer's equation, for example. Specifically, the existential probability Pi (i=1~16) is determined according to the following equations (7):

$$P1 = (1-Pc)(1-Pm)(1-Py)(1-Pk),$$

$$p2 = Pc \cdot (1-Pm)(1-Py)(1-Pk),$$

$$P3 = (1-Pc) \cdot Pm \cdot (1-Py)(1-Pk),$$

$$P4 = Pc \cdot Pm \cdot (1-Py)(1-Pk),$$

$$P5 = (1-Pc)(1-Pm) \cdot Py \cdot (1-Pk),$$

$$P6 = Pc \cdot (1-Pm) \cdot Py \cdot (1-Pk),$$

$$P7 = (1-Pc) \cdot Pm \cdot Py \cdot (1-Pk),$$

$$P8 = Pc \cdot Pm \cdot Py \cdot (1-Pk),$$

$$P9 = (1-Pc)(1-Pm)(1-Py) \cdot Pk,$$

$$P10 = Pc \cdot (1-Pm)(1-Py) \cdot Pk,$$

$$P11 = (1-Pc) \cdot Pm \cdot (1-Py) \cdot Pk,$$

$$P12=Pc \cdot Pm \cdot (1-Py) \cdot Pk,$$

$$P13=(1-Pc)(1-Pm) \cdot Py \cdot Pk,$$

$$P14=Pc \cdot (1-Pm) \cdot Py \cdot Pk,$$

$$P15=(1-Pc) \cdot Pm \cdot Py \cdot Pk,$$

and $$P16=Pc \cdot Pm \cdot Py \cdot Pk \qquad (7)$$

The existential probabilities PC, Pm, Py, Pk of the respective colors C, M, Y, K are determined straight by comparing the halftone-dot area percentage data aj with each of the thresholds T of the threshold matrixes 24. The value of the color C (M, Y, or K) in a comparison process if (aj>T: meaning if aj is greater than T. Since aj represents C, M, Y, K, aj>T signifies comparisons of C>T, M>T, Y>T, K>T where C, M, Y, K represent halftone-dot percentage values and T represents a threshold.) is the same at the level of the intermediate resolution, and the threshold T varies depending on the position of the minute area. The process can be speeded up by effecting comparison processes if (aj>T) in the step S10 altogether for each of the intermediate resolutions. To this end, a cumulative histogram of thresholds T may be generated with respect to every number of minute areas per intermediate-resolution pixel, i.e., every 28×28 dots (28×28 thresholds). The cumulative histogram has a vertical axis representing the cumulative frequency which corresponds to the existential probability Pi.

It will be understood that the result of the comparison process if (aj>T) {interpreted as the number of minute areas where the halftone-dot area percentage data aj is greater than the threshold T} effected on all the minute areas of an intermediate-resolution pixel is equal to Σhist[T] (T is equal to or smaller than aj) which represents the sum of minute areas where the threshold T is equal to or smaller than the halftone-dot area percentage data aj.

Therefore, by generating a cumulative histogram ruihist [T] from a histogram hist[T] calculated per area of each intermediate-resolution pixel, the existential probability Pc of the color C, for example, can be determined according to the following equation (8):

$$Pc=\text{ruihist}[\text{the value } aj \text{ of the color } C]=\Sigma\text{hist}[T] \qquad (8)$$

where T is a value equal to or smaller than the value aj of the color C.

Likewise, by generating a cumulative histogram ruihist [the value aj of the color M], a cumulative histogram ruihist[the value aj of the color Y], and a cumulative histogram ruihist[the value aj of the color K], it is possible to determine the existential probabilities Pm, Py, Pk in a short period of time.

As a consequence, therefore, the existential probability Pi (i=1~16) can be determined for each intermediate-resolution pixel according to the equations (7), and the first tristimulus value data X, Y, Z can be determined according to the equation (6).

Figure 8:
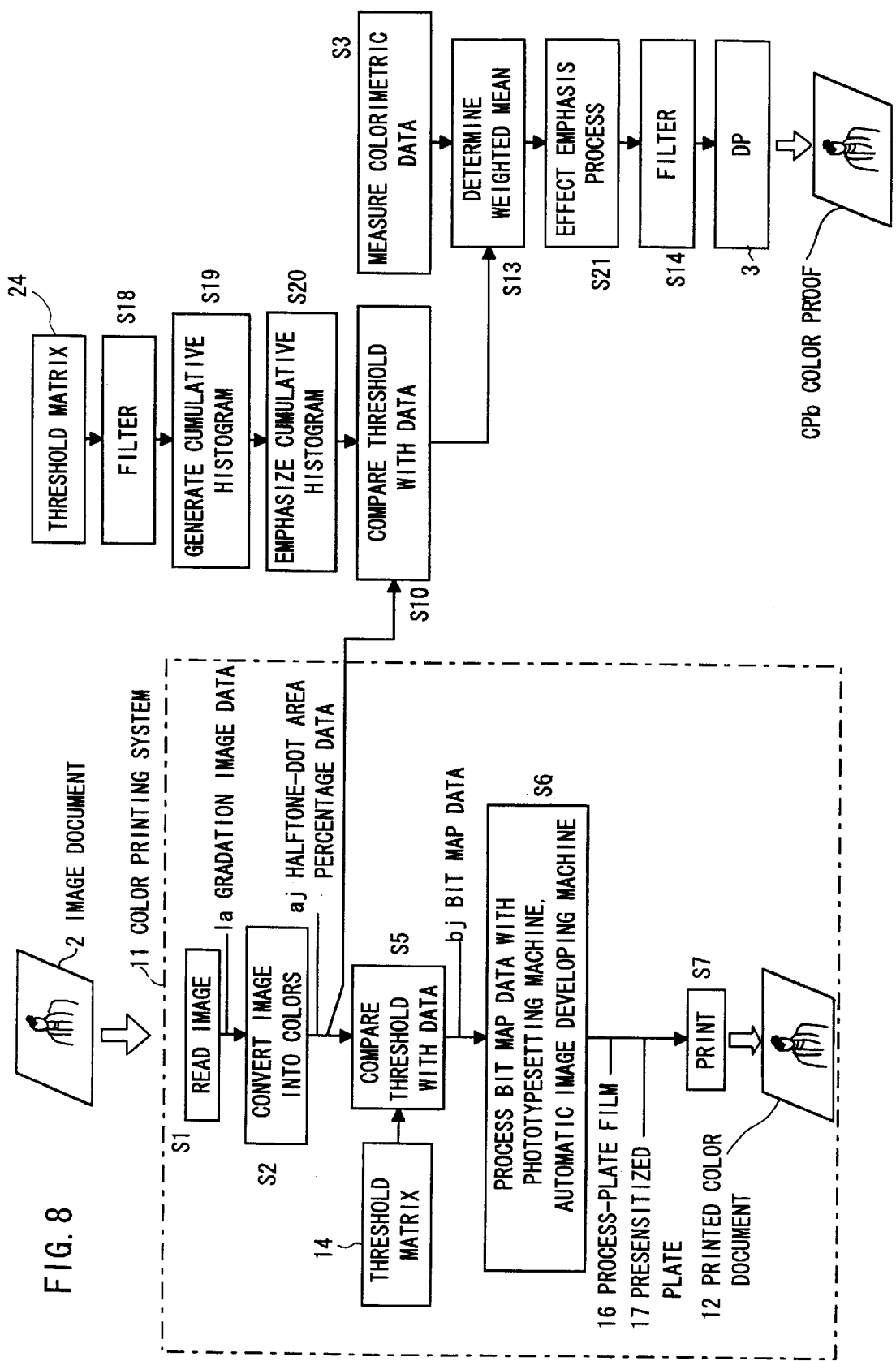
FIG. 8 is a flowchart of a process of operation of a system for producing a color proof with respect to a printed color document, the process including a processing sequence according to an embodiment of the present invention.

FIG. 8 shows a process of operation of a system for producing a color proof with respect to a printed color document, the process including a processing sequence according to an embodiment of the present invention which employs a cumulative histogram.

In the embodiment of the present invention shown in FIG. 8, since a cumulative histogram emphasizing process in a step S20 is actually carried out, a low-pass filtering process (a type of anti-aliasing process) is effected on the threshold matrixes 24 in a step S18 prior to a cumulative histogram generating process in a step S19. For an easier understanding, however, the cumulative histogram generating process in the step S19 will first be described below.

For generating a cumulative histogram, as schematically shown in FIG. 9, a threshold matrix 24 having the size {145(25400 μm/175 LIP) μm×145 μm} of one dot of 175 LPI (Line Per Inch), stated otherwise, the size of one halftone dot, is prepared. Since the threshold matrix 24 is generated at a resolution of 44800 DPI, the number of elements (the number of minute areas 32) is 256(14.5 μm_00567 μm)×256. The threshold matrix 24 has thresholds T including a central threshold T=0, thresholds T whose values progressively increase in a convolutional pattern from the central threshold T outwardly, and thresholds T=255 at the respective four corners (four vertexes) of the threshold matrix 24. At a middle point of each of the sides of the threshold matrix 24, the threshold T has a value T=128. The 256×256 thresholds T have values T=0, 1, 2, . . . , 255 for each array of 256 thresholds T. In reality, a plurality of threshold matrixes 24 are arranged in juxtaposed relationship. Original images (original image pixel data) which comprise parallel pixels of original image pixel halftone-dot percentage data aj are overlapped in a space in which the threshold matrixes 24 are arranged in juxtaposed relationship, and the halftone-dot positions of the original images are determined as described later on.

A cumulative histogram with two arguments is generated. One of the arguments represents halftone-dot percentage data (also referred to simply as halftone-dot percentage) aj, and the other argument represents a position in the threshold matrix 24, i.e., a halftone-dot space. As described below, a threshold T substitutes the position in the halftone-dot space. The threshold T substitutes the position on the halftone-dot space will hereinafter be referred to as a threshold (central threshold) th.

The position in the halftone-dot space is essentially expressed by two-dimensional coordinates represented in a halftone-dot space (x, y) of 1600 DPI. If a cumulative histogram is generated using such two-dimensional coordinates, then the cumulative histogram becomes a three-dimensional function represented by coordinates (x, y, aj) and cannot easily be handled. For this reason, the threshold th in the threshold matrix 24 is used as a substitute for the coordinates (x, y), i.e., the halftone-dot position, in the halftone-dot space of 1600 DPI.

The coordinates (x, y) in the halftone-dot space of 1600 DPI are uniquely mapped onto the threshold th in the threshold matrix 24. Therefore, the coordinates (x, y) in the halftone-dot space of 1600 DPI relative to the original image pixel halftone-dot percentage data aj may be converted into coordinates (x', y') in the threshold matrix 24 of 44800 DPI, and the value of the threshold th in the threshold matrix 24 may be checked using the coordinates (x', y') as an index.

For example, if the position in the space of 1600 DPI (the space on the original image after being converted from the resolution of 400 DPI to the resolution of 1600 DPI) is represented by coordinates (x", y") and the halftone-dot existential probability Pc of a pixel (original image pixel) whose the halftone-dot percentage aj is aj=c=10 is to be determined, then the threshold th in the space of 1600 DPI is determined based on the coordinates (x", y").

For converting the coordinates (x", y") into coordinates (x, y) in the space (represented by AmiTemp) of the threshold matrix 24, if the screen ruling to be printed is LPI=175 and the screen angle is represented by θ, then the coordinates (x, y) can be obtained according to a simple coordinate transformation process expressed by the following equations (9):

$$x = (x'' \cos \theta + y'' \sin \theta) \cdot 1600.0/175.0$$

$$y = (x'' \sin \theta - y'' \cos \theta) \cdot 1600.0/175.0 \qquad (9)$$

From the coordinates (x, y) thus obtained, the position in the threshold matrix 24 is determined according to the following equation (10), and the threshold th at the position may be read.

$$\text{AmiTemp}[\{(\text{int})(x \cdot 256)\}\%256, \{(\text{int})(y \cdot 256)\}\%256] = th \qquad (10)$$

In the equation (10), "(int)" indicates an operation to omit a decimal part for rounding-off into an integer, and "%" indicates an operation to determine a remainder. Therefore, "{(int)(x·256)}%256" means a remainder produced when "{(int)(x·256)}" is divided by 256.

The central threshold th (e.g., 175) and the halftone-dot percentage aj=c=10 thus determined are used as arguments, i.e., indexes, to draw a histogram, thereby determining the halftone-dot existential probability Pc.

Therefore, the halftone-dot existential probability Pc is expressed by Pc=ruihist[th][aj]. For example, P10=ruihist [175][10].

To generate the cumulative histogram ruihist[th][aj], a histogram hist[th] is generated from 28×28 thresholds T on the threshold matrix 24 about each of the values of the thresholds th=0~255 on the threshold matrix 24 (the positions in the halftone-dot space), and then a cumulative histogram ruihist[th] is generated from the histogram hist [th].

Specifically, the histogram hist[th] and the cumulative histogram ruihist[th] are generated as follows: As shown in FIG. 9, areas 31 of an intermediate-resolution pixel shown as square in shape, i.e., 28×28 minute areas 32, in the threshold matrix (halftone-dot template) 24 which comprises 256×256 minute areas 32 with respective thresholds T assigned thereto, are bounded so as not to overlap adjacent pixels. The frequency of thresholds T (28×28) is calculated in each of the areas 31 of an intermediate-resolution pixel with respect to the colors C, M, Y, K to generate the histogram hist[th] (th=T=0, 1, 2, . . . , 255), and the cumulative histogram ruihist[th] is generated from the histogram hist[th].

FIGS. 10A through 10C show, respectively, a histogram hist[255] generated in the vicinity of a threshold th=255 near a vertex of the threshold matrix 24, a histogram hist[128] generated in the vicinity of a threshold th=128 near the center of a side of the threshold matrix 24, and a histogram hist[0] generated in the vicinity of a threshold th=0 near the center of the threshold matrix 24. The solid-line curves in FIGS. 10D through 10F show, respectively, the schematic configurations of a cumulative histogram ruihist[255], a cumulative histogram ruihist[128], and a cumulative histogram ruihist[0] which correspond respectively to the histogram hist[255], the histogram hist[1285], and the histogram hist[0]. The cumulative histogram ruihist[255], the cumulative histogram ruihist[128], and the cumulative histogram ruihist[0] have respective vertical axes representing the cumulative frequency. The value of the cumulative frequency may be considered to represent an existential probability (the existential probability of halftone dot). When the threshold T is T=255, the existential probability is 1. The cumulative histogram ruihist[255], the cumulative histogram ruihist[128], and the cumulative histogram ruihist[0] have respective horizontal axes representing the threshold T. The threshold T corresponds to the value of the halftone-dot percentage aj as an argument.

The cumulative histogram can be generated in the manner described above in the step S19 (see FIG. 8). When the cumulative histogram emphasizing process is carried out in the next step S20 for accurately reproducing the contrast of a rosette pattern, a peculiar pattern corresponding to the size of an intermediate-resolution pixel may appear as a beat. To avoid such a difficulty, prior to the cumulative histogram generating process in the step S19, each of the thresholds T of the threshold matrix 24 is processed in a range greater than the intermediate-resolution pixel by a low-pass filter such as a Gaussian filter or the like in the step S18.

In the above description, an area 31 of an intermediate-resolution pixel is used as an integrating area for generating the cumulative histogram ruihist[th], and does not overlap adjacent areas 31 of an intermediate-resolution pixel as shown in FIG. 9. However, the low-pass filtering process (described below) is carried out in an area overlapping adjacent areas 31 of an intermediate-resolution pixel, and thereafter a cumulative histogram ruihist'[th] is generated in an area 31 of an intermediate-resolution pixel.

Figure 11:
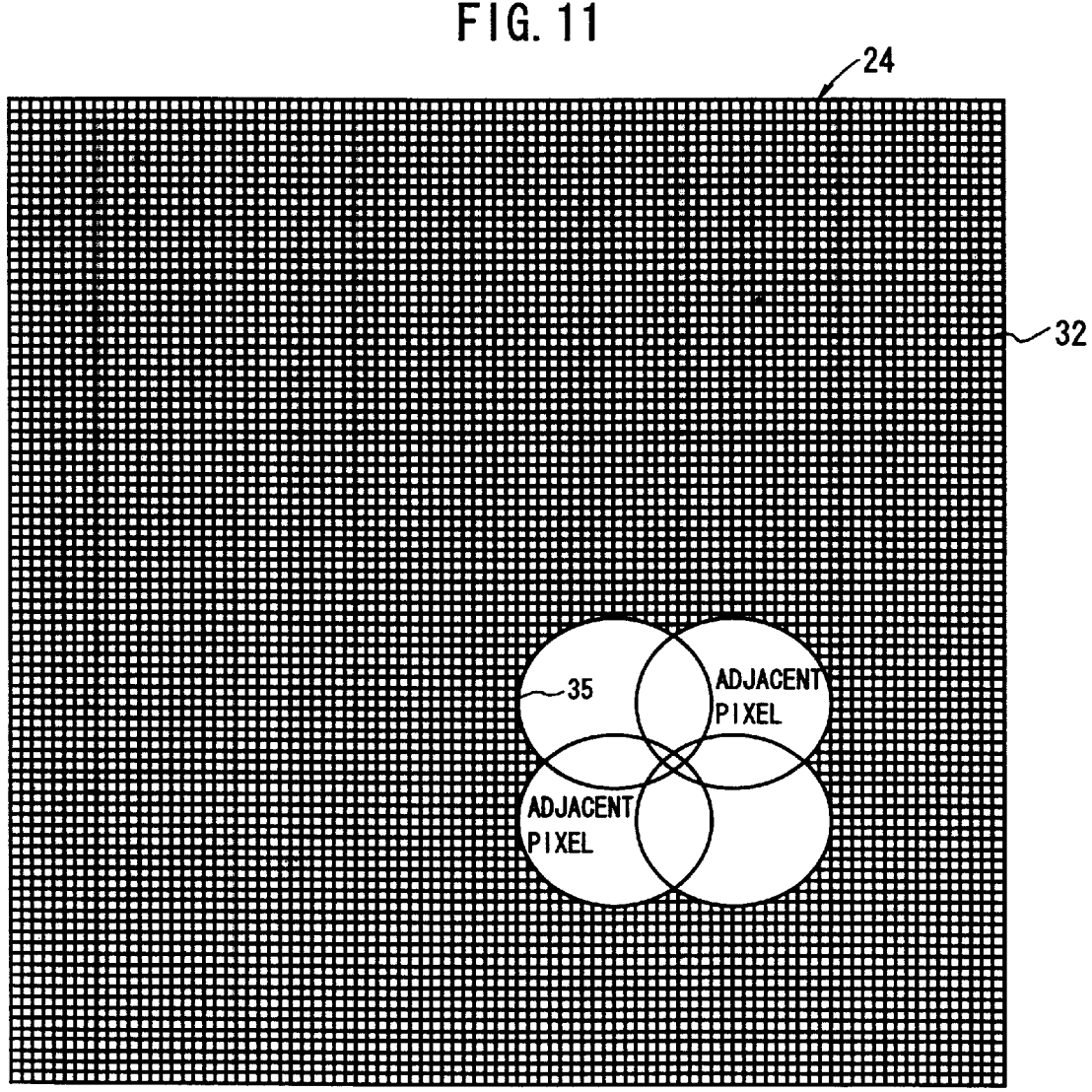
FIG. 11 is a diagram illustrative of the manner in which a cumulative histogram is generated from a threshold matrix after it has been subjected to a filtering process.

For example, as shown in FIG. 11, the low-pass filtering process is carried out in a circular area 35 containing an intermediate-resolution pixel, whose diameter is equal to the sum of the length of a diagonal line of a square area 31 of an intermediate-resolution pixel (see FIG. 9) and α.

Figure 12:
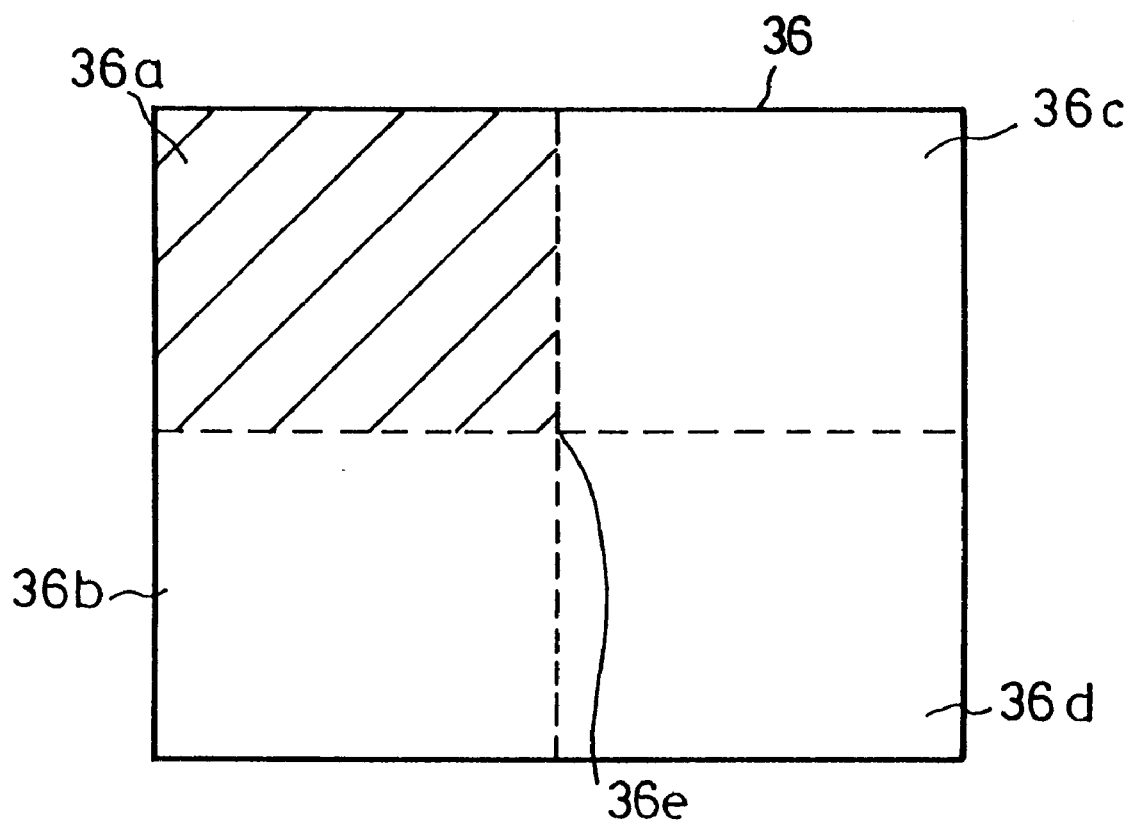
FIG. 12 is a diagram of an overall arrangement of a Gaussian filter used in the filtering process.
Figure 13:
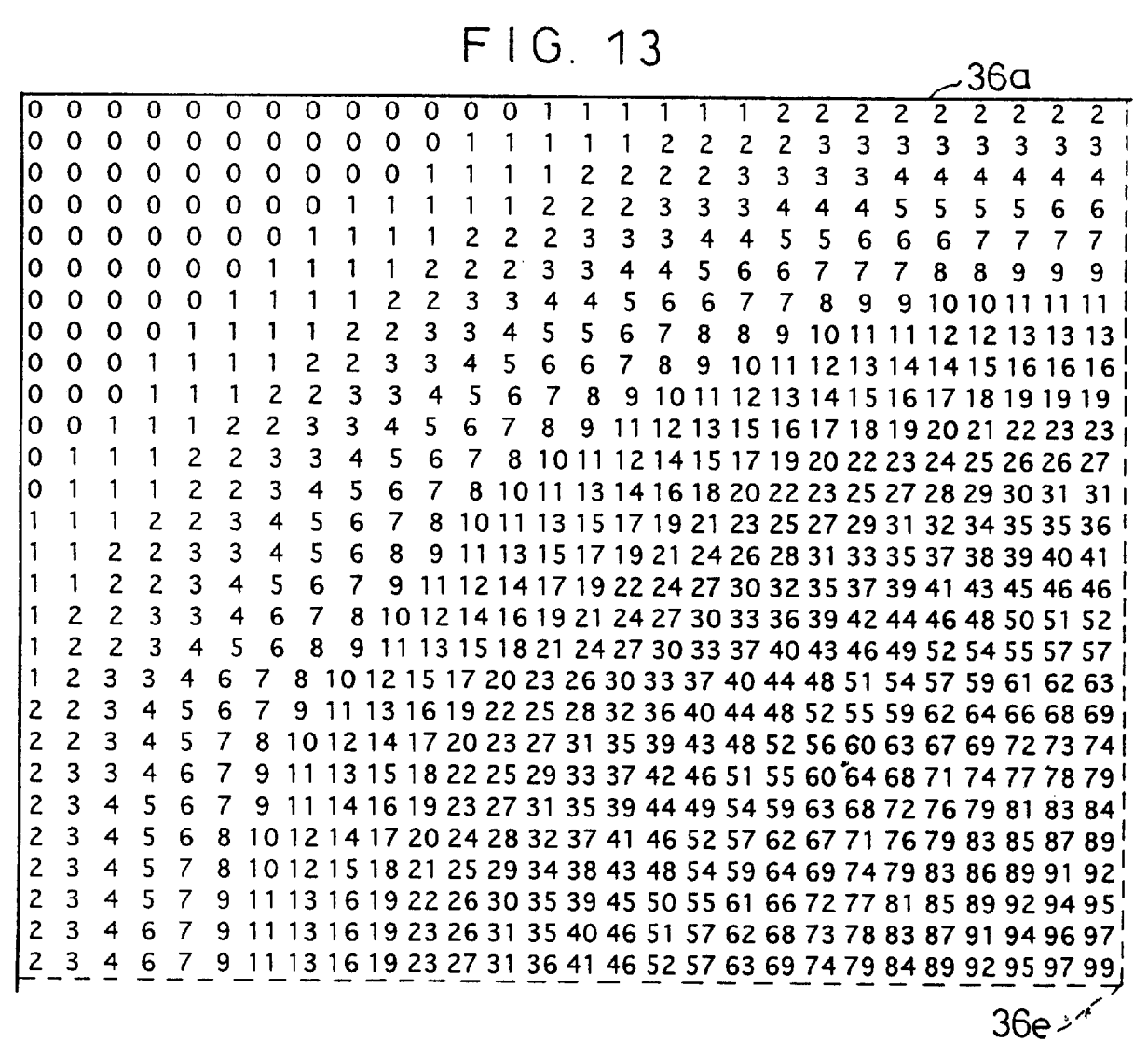

A Gaussian filter 36 having a size (area) shown in FIGS. 12 and 13 is used in the low-pass filtering process. FIG. 13 shows a pattern of coefficients whose values range from 99 to 0 in an upper left portion 36a, shown hatched in FIG. 12, of the Gaussian filter 36. A lower left portion 36b of the Gaussian filter 36 contains coefficients arranged in a pattern which is a vertical reversal of the pattern of coefficients (elements) in the upper left portion 36a. An upper right portion 36c of the Gaussian filter 36 contains coefficients arranged in a pattern which is a horizontal reversal of the pattern of coefficients in the upper left portion 36a. A lower right portion 36d of the Gaussian filter 36 contains coefficients arranged in a pattern which is a vertical and horizontal reversal of the pattern of coefficients in the upper left portion 36a. The Gaussian filter 36 is a filter whose values (weights) are progressively smaller from a center 36e outward according to a Gaussian function. The actual values of the coefficients are produced by dividing the coefficients by the sum of all the coefficients such that the sum of all the coefficients of the Gaussian filter 36 is standardized at 1.00.

The size of the Gaussian filter 36 in the illustrated embodiment is represented by 56×56 in the space of 44800 DPI {a space of one halftone dot having a screen ruling of 175 as divided into 256×256 grids (minute areas)}. Therefore, the size of the Gaussian filter 36 is exactly vertically and horizontally twice the size of a pixel of 1600 DPI (256×175/1600 DPI=28).

In the filtering process in the step S18, the values of the thresholds T of corresponding elements when the center of the Gaussian filter 36 is aligned successively with the positions of the thresholds th (0~255) are multiplied by the coefficients of the Gaussian filter 36, thereby converting the thresholds T. Cumulative histograms ruihist[th] finally converted into existential probabilities Pi are generated, as described above, in central 28×28 areas of the 56×56 areas of the converted thresholds T in the step S19. Therefore, the number of the generated cumulative histograms ruihist[th] is 256. In this embodiment, examples of the cumulative histograms ruihist[th] processed by the Gaussian filter 36 are shown by the solid-line curves in FIGS. 10D through 10F for the sake of brevity.

Figure 14:
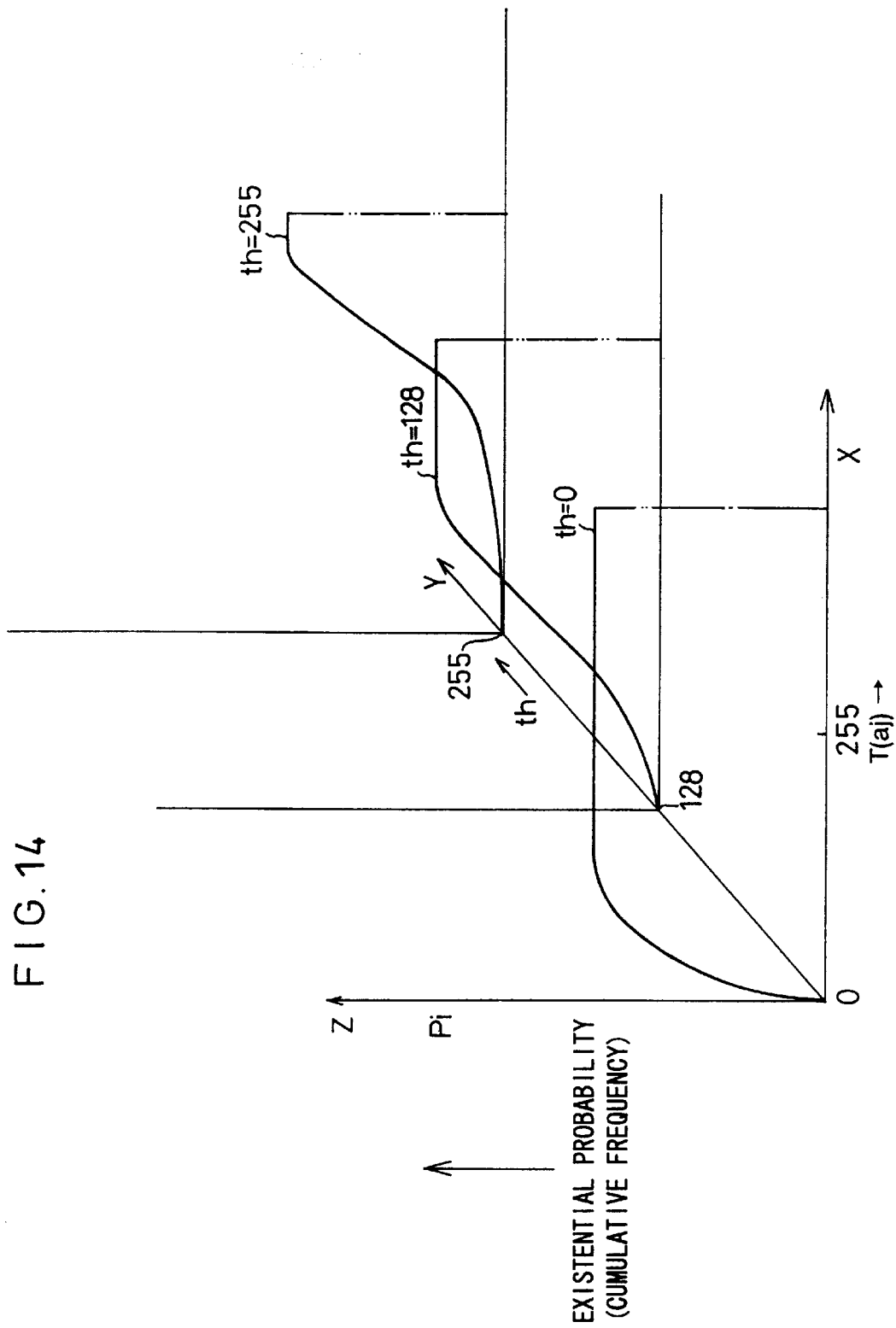
FIG. 14 is a diagram showing a bundle of cumulative histograms of respective central thresholds.

Then, the cumulative histogram emphasizing process in the step S20 is carried out. FIG. 14 schematically shows a bundle of 256 cumulative histograms ruihist[0]~[255]

arranged in the order of thresholds th, three of which cumulative histograms (th=0, th=128, th=255) are shown in FIGS. 10A through 10F. In FIG. 14, X-, Y-, and Z-axes represent the threshold T (halftone-dot percentage aj), the central threshold th, and the existential probability Pi, respectively.

Figure 15:
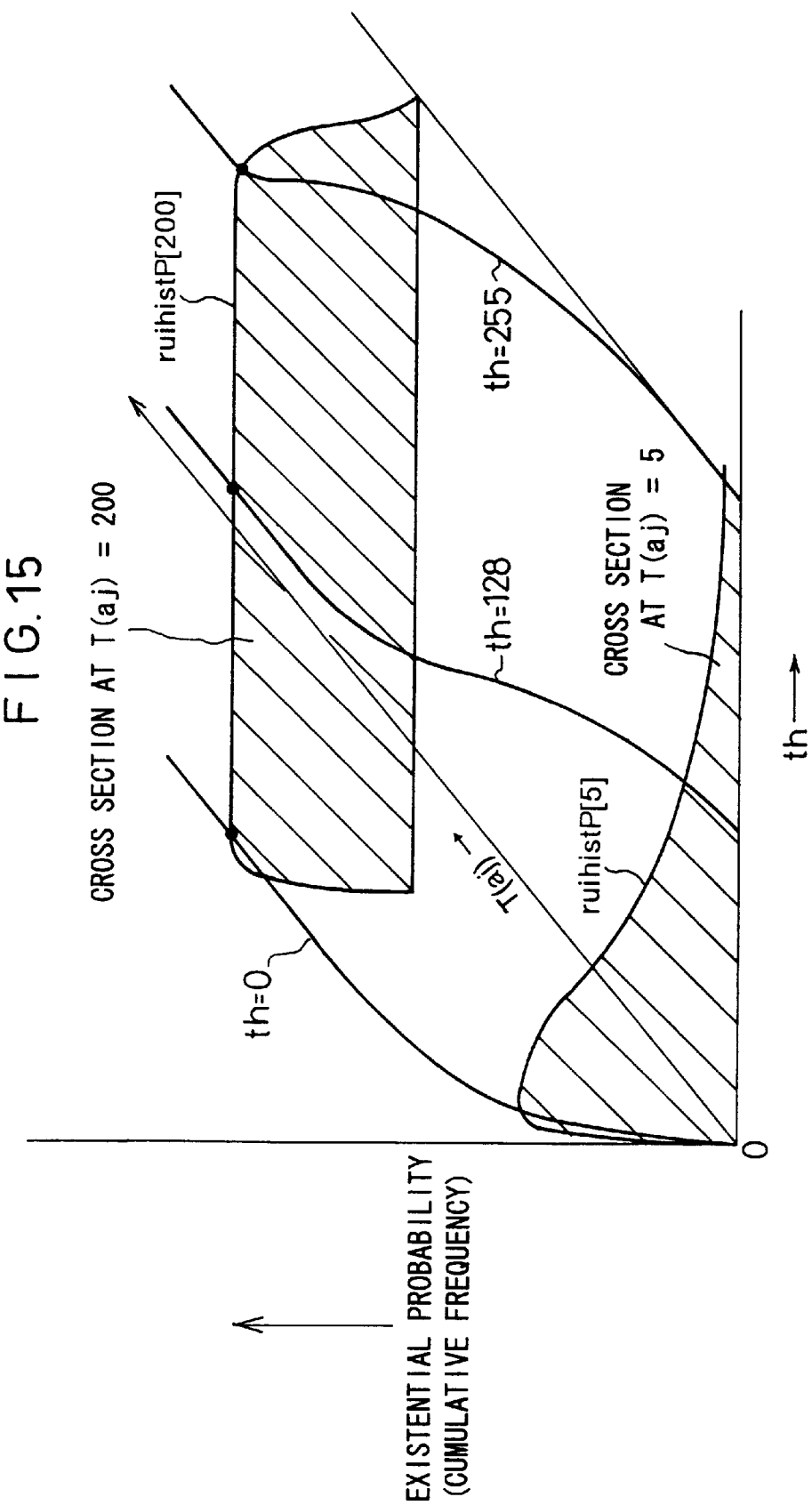
FIG. 15 is a diagram showing a bundle of cumulative histograms of respective central thresholds with X- and Y-axes in FIG. 14 shown as being switched around.

FIG. 15 shows a bundle of cumulative histograms ruihist [0]–[255] with the X- and Y-axes in FIG. 14 shown as being switched around. In FIG. 15, cross sections respectively at the threshold T=aj=5 and the threshold T=aj=200 are illustrated.

Figure 16:
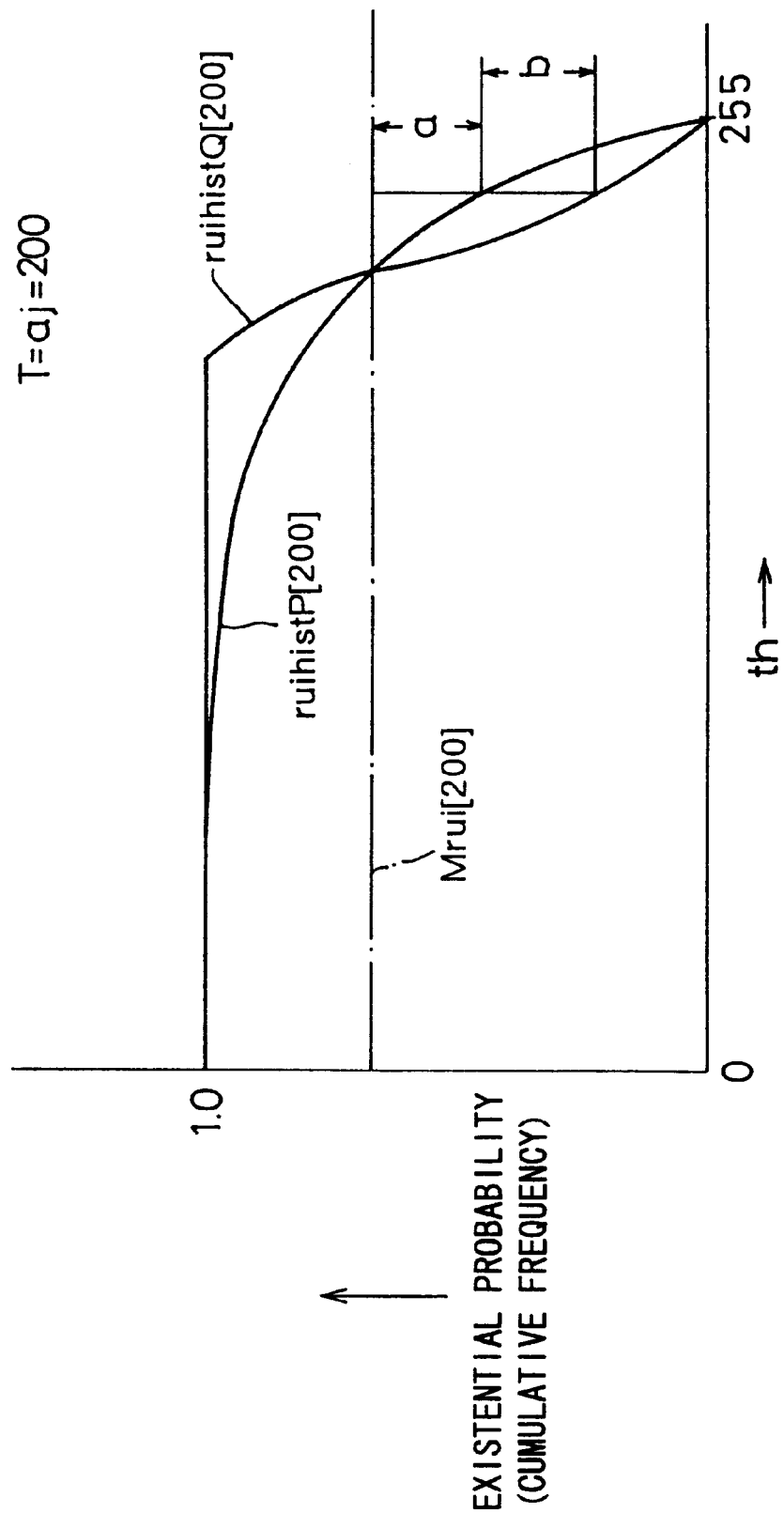
FIG. 16 is a diagram illustrative of a cumulative histogram emphasizing process.

The cumulative histogram emphasizing process is applied to all the 256 cumulative histograms ruihist[0]–[255]. By way of example, an envelope of the cross section at the threshold T=aj=200, i.e., a cumulative histogram ruihistP [200] before being subjected to the cumulative histogram emphasizing process and a cumulative histogram ruihistQ [200] after being subjected to the cumulative histogram emphasizing process, are shown in FIG. 16. In FIG. 16, an average cumulative frequency (average existential probability) Mrui[200], shown by the dot-and-dash line, at the cross section where the halftone-dot percentage aj is aj=200 is calculated according to the following equation (11):

$$Mrui[200]=(1/256)\Sigma ruihistP[200] \qquad (11)$$

where $\Sigma$ represents the sum for th=0–255.

In this embodiment, if the interval from the average cumulative frequency Mrui[200] to the cumulative histogram ruihistP[200] before being subjected to the cumulative histogram emphasizing process is represented by "a", and the interval from the cumulative histogram ruihistP[200] before being subjected to the cumulative histogram emphasizing process to the cumulative histogram ruihistQ[200] after being subjected to the cumulative histogram emphasizing process is represented by "b", then the cumulative histogram ruihistQ[200] after being subjected to the cumulative histogram emphasizing process is determined according to the following equation (12):

$$ruihistQ[200]=[\{ruihistP[200]-Mrui[200]\}\times(a+b)/a]+Mrui[200] \qquad (12)$$

As can be understood from FIG. 16, the difference between the cumulative histogram ruihistQ[200] after being subjected to the cumulative histogram emphasizing process and a reference line represented by the average cumulative frequency Mrui[200] is wider than the difference between the cumulative histogram ruihistP[200] before being subjected to the cumulative histogram emphasizing process and the reference line.

In the equation (12), a factor of amplification (also referred to as a degree of emphasis) (a+b)/b has a value greater than 1, and can experimentally be determined in view of the spreading of a beam used in the DP 3.

Figure 17:
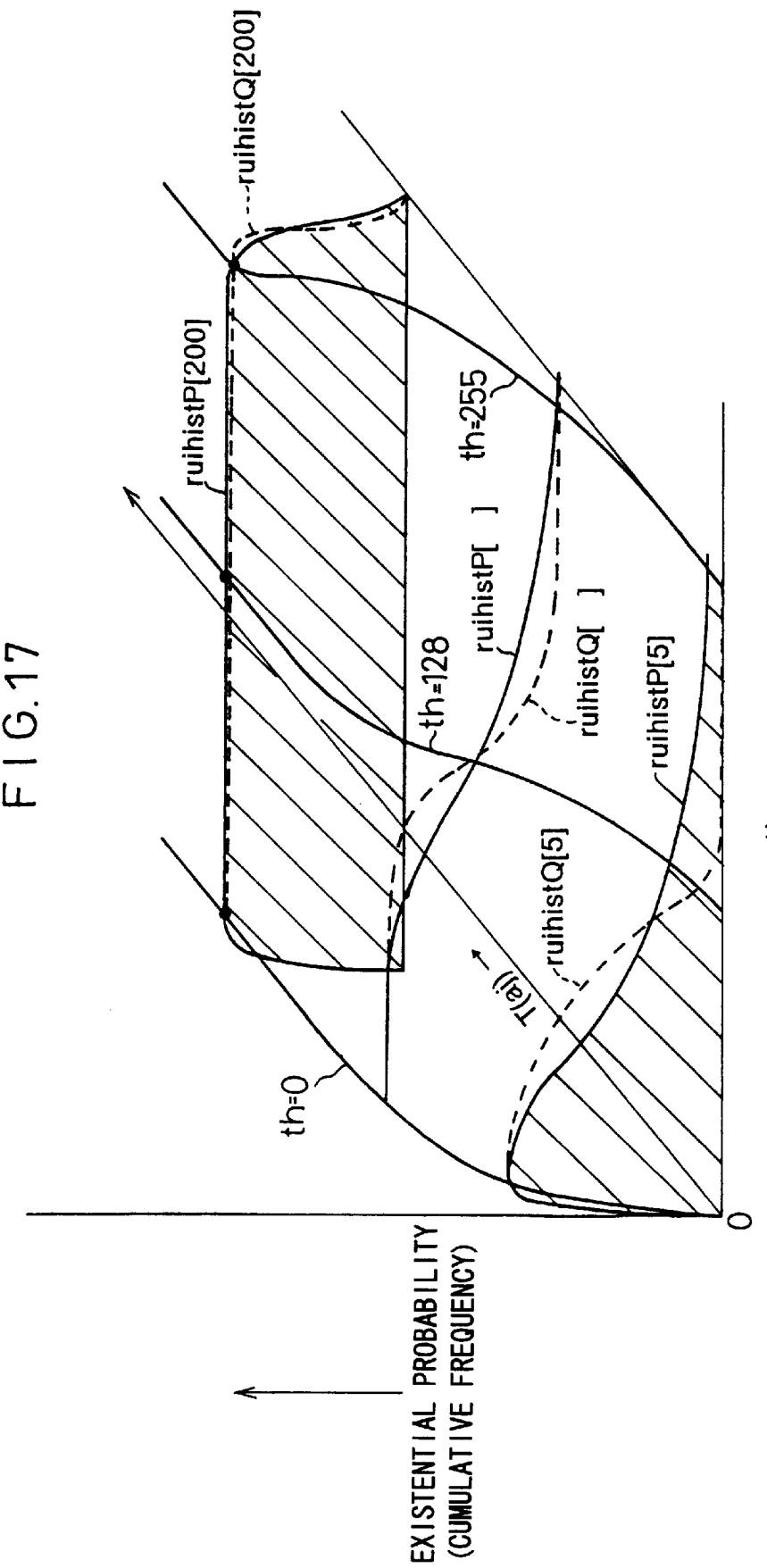
FIG. 17 is a diagram showing a bundle of cumulative histograms including other cumulative histograms before and after being subjected to the cumulative histogram emphasizing process.

FIG. 17 shows cumulative histograms ruihistQ[200], ruihistQ[5] after being subjected to the cumulative histogram emphasizing process, indicated by the dotted lines, with respect to the cumulative histograms ruihistP[200], ruihistP[5] before being subjected to the cumulative histogram emphasizing process. For an easier understanding, FIG. 17 also illustrates cumulative histograms ruihistP[ ], ruihistQ[ ] before and after being subjected to the cumulative histogram emphasizing process, which are present between the cumulative histograms ruihistP[200], ruihistP [5] before being subjected to the cumulative histogram emphasizing process and also between the cumulative histograms ruihistQ[200], ruihistQ[5] after being subjected to the cumulative histogram emphasizing process.

By rearranging the cumulative histogram ruihistQ[ ] after being subjected to the cumulative histogram emphasizing process as shown in FIG. 14, it is possible to obtain a cumulative histogram ruihist'[th][aj] after being subjected to the cumulative histogram emphasizing process which corresponds to a cumulative histogram ruihist[th][aj] before being subjected to the cumulative histogram emphasizing process.

The dotted-line curves shown in FIGS. 10D through 10F schematically represent cumulative histograms ruihist'[255] [T] (also indicated by ruihist'[255][aj]), ruihist'[128][T], ruihist'[0][T] after being subjected to the cumulative histogram emphasizing process.

Generally, when a cumulative histogram after emphasized in contrast is represented by ruihist'[th][aj]=ruihist'[th][aj], aj indicates the halftone-dot area percentage data and th indicates the position in the halftone-dot space, i.e., the central position for generating (integrating) the cumulative histogram.

The cumulative histogram ruihist'[th][aj] indicates what thresholds T are present in an area of a pixel (an intermediate-resolution pixel) of 1600 DPI around the threshold th.

The minute areas 32 where aj>T as detected by the comparison process in the step S11 for comparison between the threshold T and the halftone-dot area percentage aj of the original image are colored, i.e., coated solid, when printed. Since the cumulative histogram ruihist'[th][aj] represents a ratio indicative of the number of minute areas 32 where the threshold T is smaller than the halftone-dot area percentage aj, the cumulative histogram ruihist'[th][aj] signifies the halftone-dot existential probability Pi.

The comparison process in the step S11 determines the existential probabilities Pc, Pm, Py, Pk of the respective colors C, M, Y, K.

In the weighted-mean determining process in the step S13, the device-independent tristimulus value data (hereinafter simply referred to as colors) X, Y, Z are determined according to the equation (6) using the existential probability Pi as a weighting coefficient which has been determined in the step S10 with respect to the 16-primary colorimetric data Xi, Yi, Zi measured by a calorimeter or the like. The equation (6) is given below once again.

$$X=\Sigma(Pi\times Xi), (i=1\_16) \qquad (6)$$

Y, Z are similarly expressed.

Then, an emphasizing process in a step S21 is carried out to increase the contrast of a rosette pattern. Since the emphasizing process can be effected similarly on any of the colors X, Y, Z, the emphasizing process on the color X will typically be described below, and the emphasizing process on the remaining colors Y, Z will be described when necessary.

The values of the colors X, Y, Z on the left side of the equation (6) are represented respectively by colors Xk, Yk, Zk. As shown in FIG. 18, the colors Xk, Yk, Zk indicated by white circles are uniformly dispersed around average colors Xm, Ym, Zm indicated by a black circle at the time the halftone-dot percentages are c, m, y, k in an XYZ space. The range in which the colors Xk, Yk, Zk are uniformly dispersed is referred to as a dispersive field 40. An area 41 represents a color reproduction range of the DP 3.

The size of the dispersive field 40 is expanded according to the calculation based on the equation (13) below. It has been confirmed that the contrast of a rosette pattern can be increased by the expansion of the size of the dispersive field 40.

$$Xk' = \{(Xk/X\text{mean})^\gamma\} \cdot X\text{mean} \quad (13)$$

where γ represents a rosette contrast emphasis constant whose value is selected between 1.0 and 3.0, and represents a power. The color Xmean is a color determined using values whose halftone-dot percentages are c, m, y, k and existential probabilities are Pc, Pm, Py, Pk and which are substituted in the Neugebauer's equation.

Figure 19:
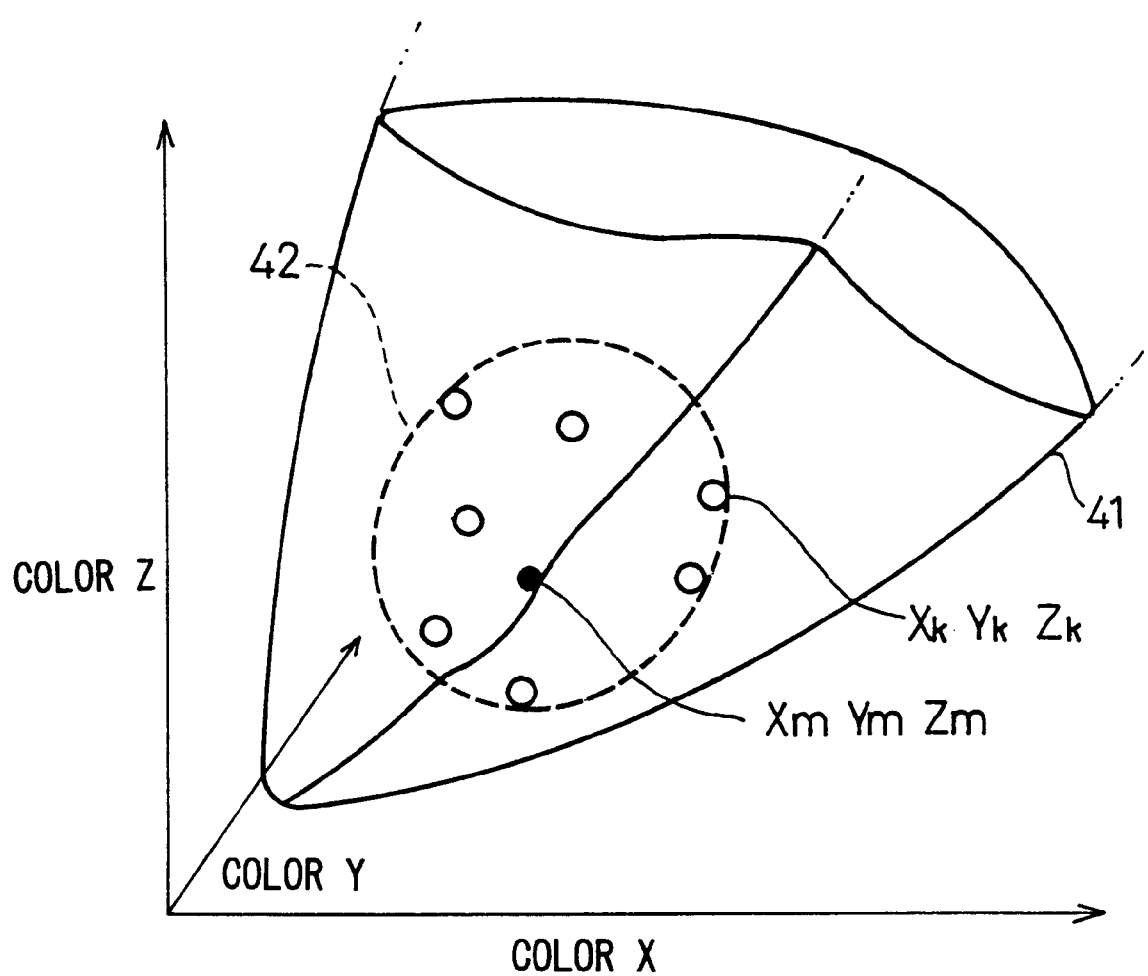
FIG. 19 is a diagram illustrative of a dispersive field after the contrast of a rosette pattern is emphasized.

The dispersive field 40 which has been expanded into a dispersive field 42 is schematically shown in FIG. 19. The dispersive field 42 now approaches the color reproduction range 41, allowing an image with high saturation to be obtained, so that the rosette pattern can be visually recognized clearly (with high contrast).

It is better for increasing the accuracy of colors to use a value determined again by averaging Xk', Yk', Zk' after being processed by γ according to the actually used equation (13), rather than the color Xmean determined according to the Neugebauer's equation, as the average color Xmean used when the dispersive field 42 is expanded.

Specifically, if coordinates of a pixel whose XYZ values are to be calculated are represented by (x0, y0) at the coordinates (x, y) in an orthogonal space of 1600 DPI, then 5×5=25 colors Xk, Yk, Zk are determined with respect to pixels at 5×5 coordinates (x0−2, y0−2)~(x0+2, y0+2) in the vicinity of the coordinates (x0, y0). From these colors Xk, Yk, Zk and the equation (13), there are determined 25 colors of each of Xk', Yk', Zk'.

The 25 colors Xk' are averaged into an average value aveXk' according to the following equation (14):

$$\text{ave}Xk' = (1/25) \cdot (X1' + X2' + \ldots + X25') \quad (14)$$

The average value avexk' thus obtained and the first average color Xmean are averaged into a temporary new average color Xmean' according to the following equation (15):

$$X\text{mean}' = (\text{ave}Xk' + X\text{mean})/2 \quad (15)$$

Then, new 25 colors Xk' are determined from the temporary new average color Xmean' and the 5×5=25 colors Xk, Yk, Zk according to the above equation (13).

The new 25 colors Xk' thus determined are averaged into a new average color avexk' again according to the equation (14).

From the new average color aveXk' and the temporary average color Xmean', there is determined a final (third) average color Xmean' according to the equation (15) using the average color Xmean' as the color Xmean. The average color Xmean' thus determined is used as the average color Xmean in the equation (13) for expanding the dispersive field 40 into the dispersive field 42, thereby increasing the accuracy of colors.

Figure 20:
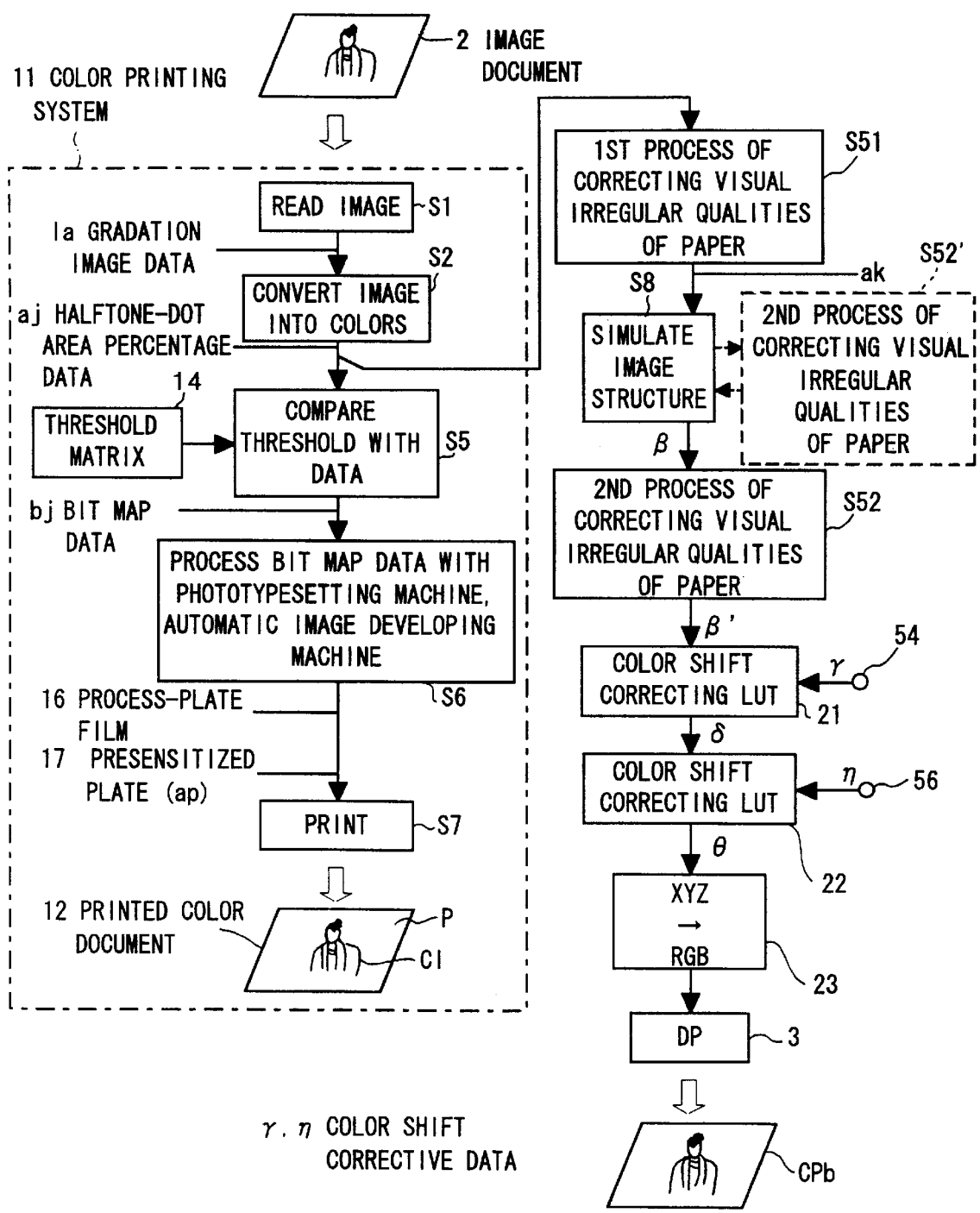
FIG. 20 is a flowchart of a process of operation of a system for producing a color proof with respect to a printed color document, the process including a processing sequence according to another embodiment of the present invention.

FIG. 20 shows a process of operation of a system for producing a color proof with respect to a printed color document, the process including a processing sequence according to another embodiment of the present invention. Those parts in FIGS. 20 through 26 which are identical to those shown in FIGS. 27 and 1_19 are denoted by identical reference characters, and will not be described in detail below.

In this embodiment, colors and an image structure of a printed color document 12 produced by the color printing system 11 and visual irregular qualities of paper of the printed color document 12 are accurately reproduced on a color proof CPb generated by the DP 3.

A first correcting process in a step S51 for correcting visual irregular qualities of paper and a second correcting process in a step S52 or a step S52' for correcting visual irregular qualities of paper are carried out, as described later on, to express (reproduce) the visual irregular qualities of paper in substantially the same manner as the real printed color document 12. Furthermore, an image structure simulation process in a step S8 as disclosed in Japanese patent application No. 7-273297 is carried out to exactly reproduce an image structure of the printed color document 12. Since a color shift occurs when the image structure is reproduced, a color shift correcting look-up table (LUT) 21 is required to correct such a color shift. A color shift correcting LUT 22 is also required to correct a color shift which is produced because a color reproduction range of the DP 3 and a color reproduction range of the color printing machine differ from each other.

The color shift correcting look-up tables 21, 22 may be combined into a single look-up table, or may be replaced with corrective functions which approximate the color shift correcting look-up tables 21, 22.

Data corrected by the color shift correcting LUTs 21, 22 are common color space data described above with respect to the related art (also referred to as device-independent image data or colorimetric data). As described above with respect to the related art, the common color space data are converted into color space data inherent in the DP 3 (device-depending image data) by a LUT 23 in FIG. 20, and thereafter are supplied to the DP 3, which can then generate the color proof CPb capable of accurately reproducing the image structure, colors, and visible irregular qualities of paper. The LUT 23 may be incorporated in the DP 3.

The first correcting process in the step S51 for correcting visual irregular qualities of paper will be described below.

The first correcting process for correcting visual irregular qualities of paper is a process to reproduce on a color proof CPb outputted from the DP 3 so-called "impression irregularity" that is visually recognized as a randomly changing density pattern on a reproduced image which is printed on a print sheet when ink is transferred from a uniform image on a press plate to the print sheet, and so-called "harshness" that is visually recognized as a smaller randomly changing density pattern which tends to disturb the edges of a reproduced image which is printed on a print sheet.

In order to ascertain how the first correcting process may be carried out, the inventor has observed a halftone-dot image CI on a print sheet P of the printed color document 12 based on a microscopic photograph. As a result, the inventor has found that halftone dots of ink applied to the printed color document 12 have their areas or sizes randomly changed compared with halftone dots on the presensitized plates 17. The inventor has also found that the shapes of halftone dots of ink transferred to the printed color document 12 are different from the shapes of halftone dots on the presensitized plates 17, and that these shapes are of microscopic nature and cannot be distinguished from each other by human visual capabilities.

It has also been found that the areas of the individual corresponding pixels in the halftone-dot images CI on the print sheet do not change at a uniform rate, but change at a random rate, with respect to the areas of the individual pixels on the presensitized plates 17.

It has also been found that even if images are printed by the same presensitized plates 17, the rate of change of the areas of the pixels of the images varies differently on wood-free paper, art paper, coated paper, etc., for example.

It has also been found that as the halftone-dot area percentage of the presensitized plates 17 varies from 0% to 100%, the rate of change of the areas of the pixels of the image on the printed color document 12 varies differently depending on the halftone-dot area percentage.

FIG. 21 shows average random rates Hr of change of the halftone-dot area percentage which have been obtained from experimental results based on microscopic observations. In FIG. 21, the curve Pw represents the average random rate Hr of change of the halftone-dot area percentage on wood-free paper, the curve Pa represents the average random rate Hr of change of the halftone-dot area percentage on art paper, and the curve Pc represents the average random rate Hr of change of the halftone-dot area percentage on coated paper. The print sheet P may also be of mat coated paper.

The average random rates Hr of change of the halftone-dot area percentage shown in FIG. 21 will be described below with respect to the curve Pw of wood-free paper. When the halftone-dot area percentage of the presensitized plates 17 is about 55%, the average random rates Hr of change of the halftone-dot area percentage on wood-free paper as represented by the curve Pw is 10%, meaning that the halftone-dot area percentage of the print sheet P of wood-free paper varies in the range of ±10%. This also means that the value of 55% of the halftone-dot area percentage of individual halftone dots on the presensitized plates 17 may correspond to random values of 45%, 56%, 63%, for example, of the halftone-dot area percentage of corresponding individual halftone dots in the halftone-dot image CI on the print sheet P.

Therefore, the first correcting process for correcting visual irregular qualities of paper may be carried out depending on the average random rate Hr of change of the halftone-dot area percentage.

If a halftone-dot area percentage (which is assumed to be equal to the halftone-dot area percentage ap of the presensitized plates 17) before the first correcting process for correcting visual irregular qualities of paper is carried out is represented by ap and a halftone-dot area percentage after the first correcting process for correcting visual irregular qualities of paper is carried out is represented by ak, then the halftone-dot area percentage ak is expressed by the following equation (16):

$$ak = ap = Hr\ (P,\ ap) \times R \qquad (16)$$

If ap=aj, then the halftone-dot area percentage ak is expressed by the following equation (17):

$$ak = aj + Hr\ (P,\ aj) \times R \qquad (17)$$

where Hr (P, ap) represents the value of an average random rate of change of the halftone-dot area percentage which is uniquely determined from the curve Pw (wood-free paper), the curve Pa (art paper), and the curve Pc (coated paper) in FIG. 21 based on the type of the print sheet P and the halftone-dot area percentage ap on the presensitized plates 17.

In the equations (16), (17), R represents standardized normal random numbers which have an average value of 0 and can take a value in the range from +1 to −1. For example, R can take a value of −0.5, −0.8, or the like.

Using the halftone-dot area percentage ak after being processed by the first correcting process for correcting visual irregular qualities of paper, a color proof CPb is generated by the DP 3. The color proof CPb thus generated is capable of reproducing so-called "impression irregularity" that is visually recognized as a randomly changing density pattern on the halftone-dot image CI printed on the print sheet P and so-called "harshness" that is visually recognized as a smaller randomly changing density pattern which tends to disturb the edges of the halftone-dot image (reproduced image) CI, the image being uniform on the presensitized plates 17.

Figure 22:
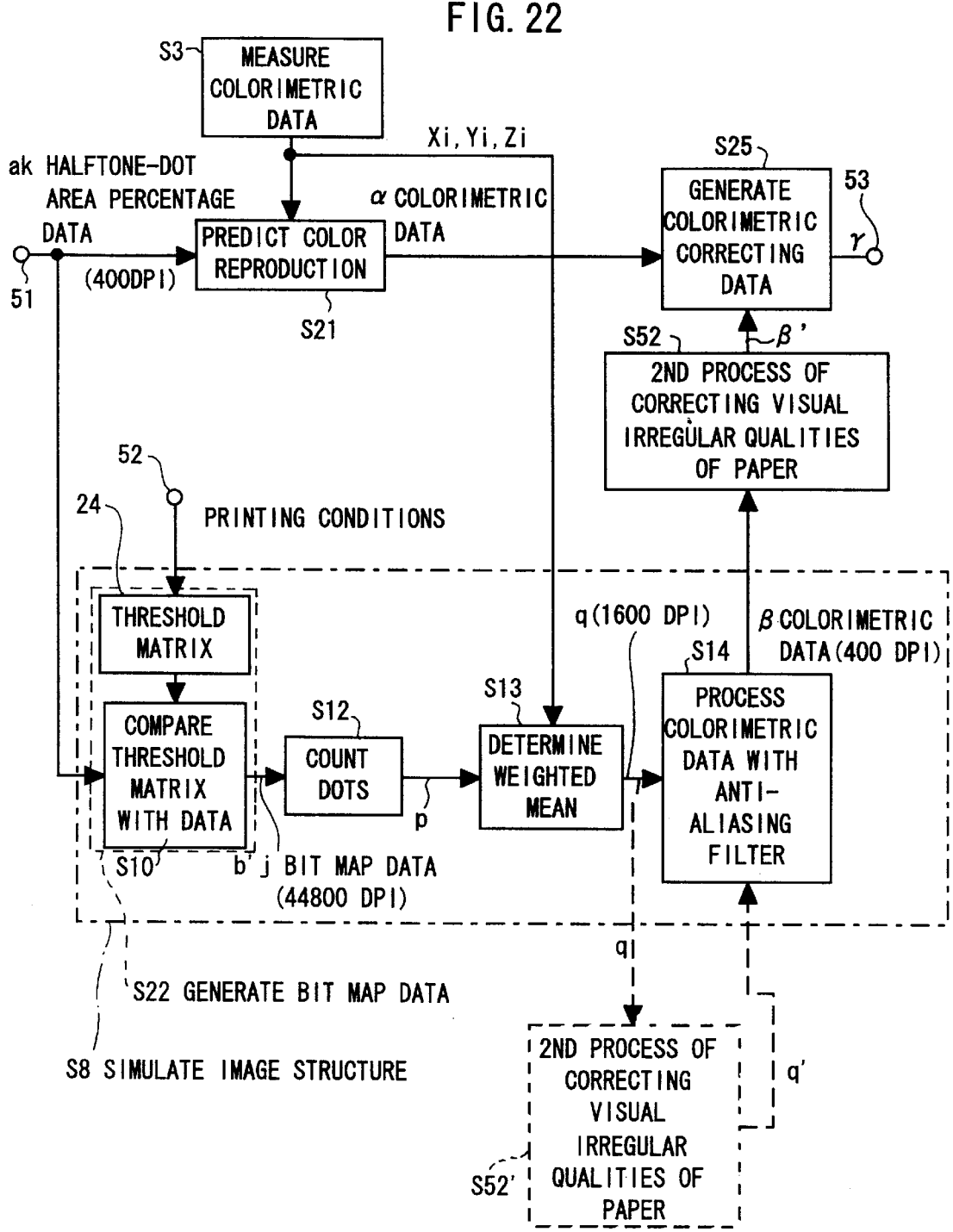
FIG. 22 is a flowchart of a procedure for generating color shift corrective data according to an image structure simulation process.

FIG. 22 shows an arrangement, including the image structure simulation process in the step S8, for generating the color shift correcting LUT 21 for correcting a color shift produced by the image structure simulation process in the step S8.

For generating the color shift correcting LUT 21, a color reproduction predicting process in a step S21 and the image structure simulation process in the step S8 are first carried out.

The color reproduction predicting process in the step S21 may be the process using the Neugebauer's equation, as described above, or a process in which when the halftone-dot area percentage data aj of each of the four plates C, M, Y, K are varied by a given value (%), a plurality of color samples printed on the printed color document 12 are measured by a calorimeter to produce colorimetric data in a CIE colorimetric system of each of the color samples, e.g., colorimetric data Xi, Yi, Zi which are tristimulus value data, and colorimetric data between the color samples are determined by an interpolation process, after which a look-up table or corrective function composed of the colorimetric values measured by the calorimeter and the colorimetric data determined by the interpolation process, which are addressable by the halftone-dot area percentage data ak as input data, is produced. In either of these processes, it is necessary at least to measure the colorimetric data Xi, Yi, Zi (i represents $2^4$=16 colors for the four plates C, M, Y, K) for each color with a calorimeter (see the step S3 in FIG. 27).

In the color reproduction predicting process in the step S21, colorimetric data α are obtained by multiplying the halftone-dot area percentage data ak having a resolution of 400 DPI which are supplied from an input terminal 51, by the colorimetric data Xi, Yi, Zi, for example.

In the image structure simulation process in the step S8, bit map data peculiar to the image structure simulation process are generated in a step S22. The image structure simulation process in the step S8 comprises threshold matrixes 24, a comparison process in a step S10, a counting process in a step S12, a weighted-mean determining process in a step S13, and an anti-aliasing filtering process in a step S14 which are identical to those shown in FIG. 1. These steps will briefly be described below.

Threshold matrixes 24 are selected depending on the screen ruling and screen angles which are the same as those of printing conditions supplied from an input terminal 52. For reproducing various patterns of moiré, e.g., primary and secondary moiré, and also reproducing moiré depending on various screen generating conditions, the threshold matrixes 24 whose resolution is higher than the resolution of the threshold matrixes 14 are selected in order to increase the resolution of bit map data b'j. Since the screen ruling and screen angles of the threshold matrixes 24 are necessarily the same as those of the printing conditions for reproducing moiré, etc., the screen ruling of the threshold matrixes 24 is 175, and the screen angles of the of the threshold matrixes 24 for the plates M, C, K have angle differences of 45°, 75°, 15°, respectively, with respect to a reference (0°) which is provided by the plate Y, as described above.

In order to increase the resolution, the threshold matrixes 24 for generating halftone dots have elements 256×256= 65536. The threshold in each of the elements may take either one of values of 0, 1, 2, 3, . . . , 255, for example. The threshold matrixes 24 and the halftone-dot area percentage data aj are compared with each other, thus generating bit map data b'j in a step S10.

The bit map data b'j for the plates C, M, Y, K have a resolution of 44800 (256×175) DPI. The resolution is required to be of 2000 DPI or higher. Here, the resolution of 44800 DPI will be described as a preferred example suitable for various conditions as described above.

Then, the bit map data b'j of 44800 DPI are converted into data of 1600 DPI. For converting the bit map data b'j of 44800 DPI, a counting process is carried out in a step S12 by counting 28×28 (=784) dots of the bit map data b'j and converting them into one dot of count data p.

As described above with reference to FIGS. 5A and 5B, the area percentages ci for the respective colors are calculated with respect to every 28×28 dots, thereby generating count data p of 1600 DPI (the value of each element is represented by the area percentage ci). Then, the colorimetric data Xi, Yi, Zi (i represents $2^4=16$ colors for the four plates C, M, Y, K) of each of the 16 solid colors printed on the printed color document 12, which have been measured by the calorimeter in the step S3, are processed into colorimetric data q (tristimulus value data X, Y, Z) using the area percentages ci for the respective colors counted in the step S12 as a weighting coefficient, according to the equation (5) given above in a step S13.

When the counting process in the step S12 and the weighted-mean determining process in the step S13 for each group of 784 (28×28) dots are carried out in the full range of the bit map data b'j of 44800 DPI, the colorimetric data q of 1600 DPI are obtained.

Then, the obtained colorimetric data q of 1600 DPI are processed by an anti-aliasing filter AF shown in FIG. 3 into colorimetric data β (tristimulus value data X, Y, Z) of 400 DPI which is equal to the resolution of the DP 3 in a step S14.

The anti-aliasing filtering process in the step S14 is inserted to avoid, in advance, aliasing noise which would be introduced due to the resolution of the DP 3 when the color proof CPb is to be generated with the resolution (400 DPI in this embodiment which is lower than the resolution of 1600 DPI of the printed color document 12) of the DP 3. For effectively carrying out the anti-aliasing filtering process, it is necessary that the resolution of the image data (the colorimetric data q) which is an original signal to be processed by the anti-aliasing filter AF be higher than the resolution (400 DPI) of the DP 3. In this embodiment, the resolution of the image data (the colorimetric data q) to be processed by the anti-aliasing filter AF is set to 1600 DPI.

Figure 23A:
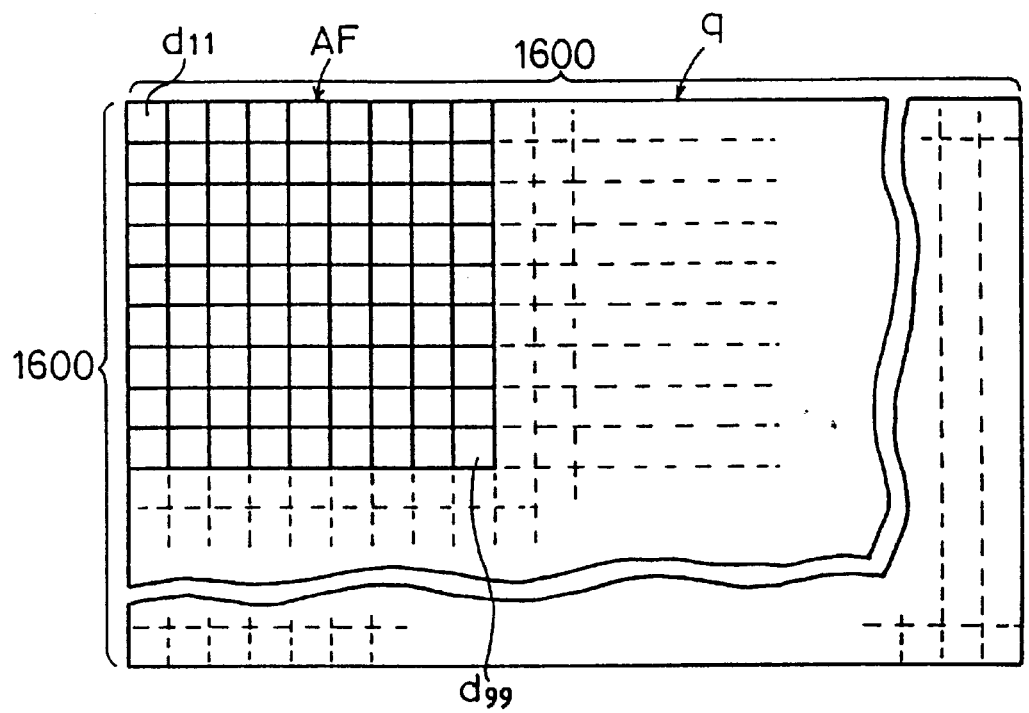
FIGS. 23A and 23B are diagrams illustrative of the manner in which colorimetric data are processed by an anti-aliasing filter, FIG. 23A showing a initial processing stage, and FIG. 23B showing a next processing stage.
Figure 23B:
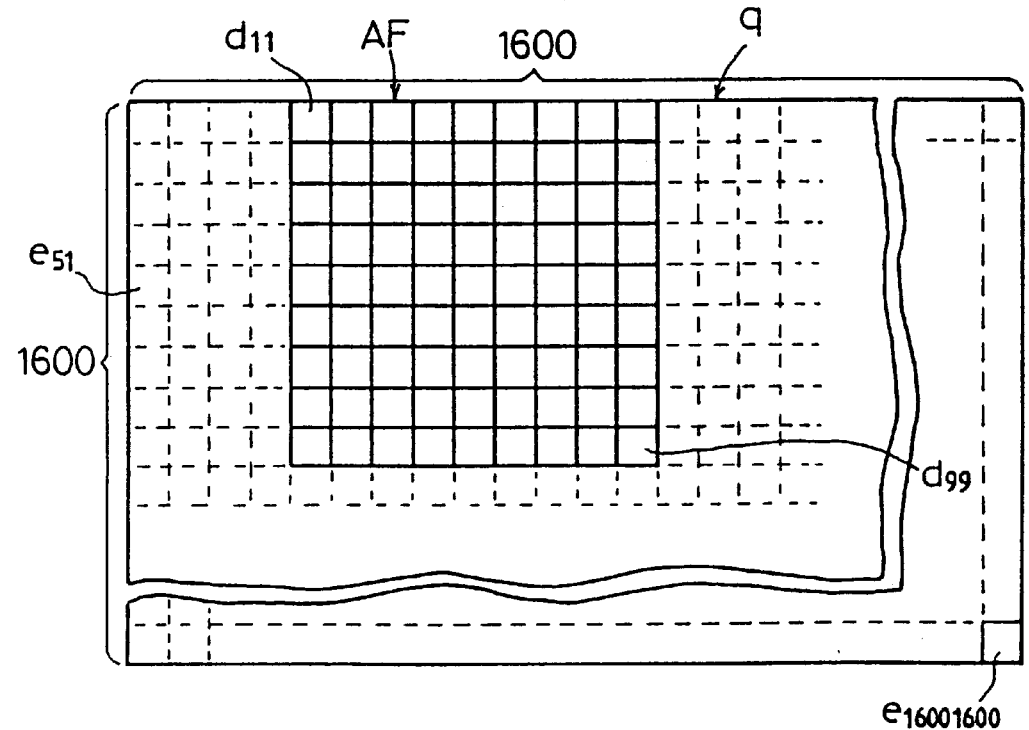

FIGS. 23A and 23B are illustrative of the anti-aliasing filtering process. FIGS. 23A and 23B are equivalent to FIGS. 6A and 6B, respectively. As shown in FIG. 23A, 9×9 dots in an upper left portion of the colorimetric data q of 1600 DPI are associated with the anti-aliasing filter AF of the 9×9 matrix whose elements are represented by dij as shown in FIG. 3, and the corresponding elements are multiplied, after which the sum of the products is determined. In this manner, the anti-aliasing filtering process is carried out. More specifically, if each of the elements of the colorimetric data q is represented by eij, then $\Sigma(d_{ij} \times e_{ij})$ (for 9×9 elements) is calculated, and used as the colorimetric data β having a resolution of 400 DPI. While the sum of the anti-aliasing filter AF is standardized at $\Sigma d_{ij}=1$ as described above, since multiplications involving decimal fractions are time-consuming, the values shown in FIG. 3 may be used as the values of the elements of the anti-aliasing filter AF, which are then represented by $d'_{ij}$, and $\Sigma(d'_{ij} \times e_{ij})/\Sigma d'_{ij}$ may be determined as a value produced as a result of the anti-aliasing filtering process.

Because the anti-aliasing filtering process converts the colorimetric data q of 1600 DPI into the colorimetric data β of 400 DPI, a second anti-aliasing filtering process on the colorimetric data q may be carried out by shifting the anti-aliasing filter AF by 4 dots of the colorimetric data q to the right, for example, as shown in FIG. 23B. Similarly, the anti-aliasing filtering process is successively effected by shifting the anti-aliasing filter AF by 4 dots. After the anti-aliasing filtering process is carried out in a position equal to the right-hand end of the colorimetric data q, a fifth element $e_{51}$ from above shown in FIG. 23B is associated with an element $d_{11}$ of the anti-aliasing filter AF, and then the anti-aliasing filtering process is successively effected by shifting the anti-aliasing filter AF by 4 dots until an element $e_{1600\,1600}$ is associated with an element $d_{99}$. In this fashion, the colorimetric data q of 1600 DPI can be converted into the colorimetric data β of 400 DPI with its resolution reduced from the resolution of the colorimetric data q. The anti-aliasing filtering process may be regarded as a filtering process for cutting off a spatial frequency response inherent in the DP 3 while maintaining a spatial frequency response peculiar to printed halftone dots of the printed color document 12.

The second correcting process in the step S52 for correcting visual irregular qualities of paper will be described below.

The second correcting process for correcting visual irregular qualities of paper is a process to reproduce on a color proof CPb outputted from the DP 3 so-called "texture" that is visually recognized as a density pattern inherent in the type of paper of the print sheet P.

The second correcting process for correcting visual irregular qualities of paper may be carried out prior to the anti-aliasing filtering process in the step S14, as in a step S52' indicated by the dotted lines in FIG. 22. If the second correcting process for correcting visual irregular qualities of paper is carried out on colorimetric data q having a resolution of 1600 DPI (also referred to as an intermediate resolution) prior to the anti-aliasing filtering process, then the time required for calculations is longer as the resolution is higher, but structures with smaller texture can be taken into account and the accuracy of reproduction can be made higher, than if the second correcting process for correcting visual irregular qualities of paper is carried out on the colorimetric data β having a resolution of 400 DPI (also referred to as a printer resolution) after the anti-aliasing filtering process.

According to a finding of the inventor, a minimum size capable of expressing texture of paper, i.e., a density change (lightness change) of paper, is 5 mm×5 mm. Therefore, a template having a size of 5 mm×5 mm (referred to as a paper texture template) is produced for correcting texture of paper. The paper texture template has elements whose number is expressed by $(1600 \text{ DPI}/5 \text{ mm})^2$ if the second correcting process for correcting visual irregular qualities of paper is to be effected prior to the anti-aliasing filtering process in the step S14 and $(400 \text{ DPI}/5 \text{ mm})^2$ if the second correcting process for correcting visual irregular qualities of paper is to be effected subsequent to the anti-aliasing filtering process in the step S14.

Specifically, the lightness of each of the elements of the paper texture template is determined using either a microscopic photograph of or a densitometer which measures minute area densities of surfaces of solid colors of C, M, Y, K printed on sheets of wood-free paper, art paper, and coated paper when the halftone-dot area percentage data ap of the presensitized plates 17 as press plates are 100%. The lightness of each of the elements is standardized by the average lightness of the paper texture template such that the lightness will not vary when the paper texture template is applied to the colorimetric data q or the colorimetric data β, with lightness ratios selected such that the average lightness is 1.00. Therefore, each of the elements of the template stores the data of a lightness ratio. In this manner, the paper texture template with its elements representing colorimetric lightness ratios is generated for each of the sheets of wood-free paper, art paper, and coated paper.

When the paper texture template having a size of 5 mm×5 mm is applied parallel to colorimetric data, joints based on lightness difference appear at the edges of the paper texture template due to the paper texture template applied to the colorimetric data.

The cause of the appearance of such joints will visually be described below with reference to FIG. 24.

Figure 24:
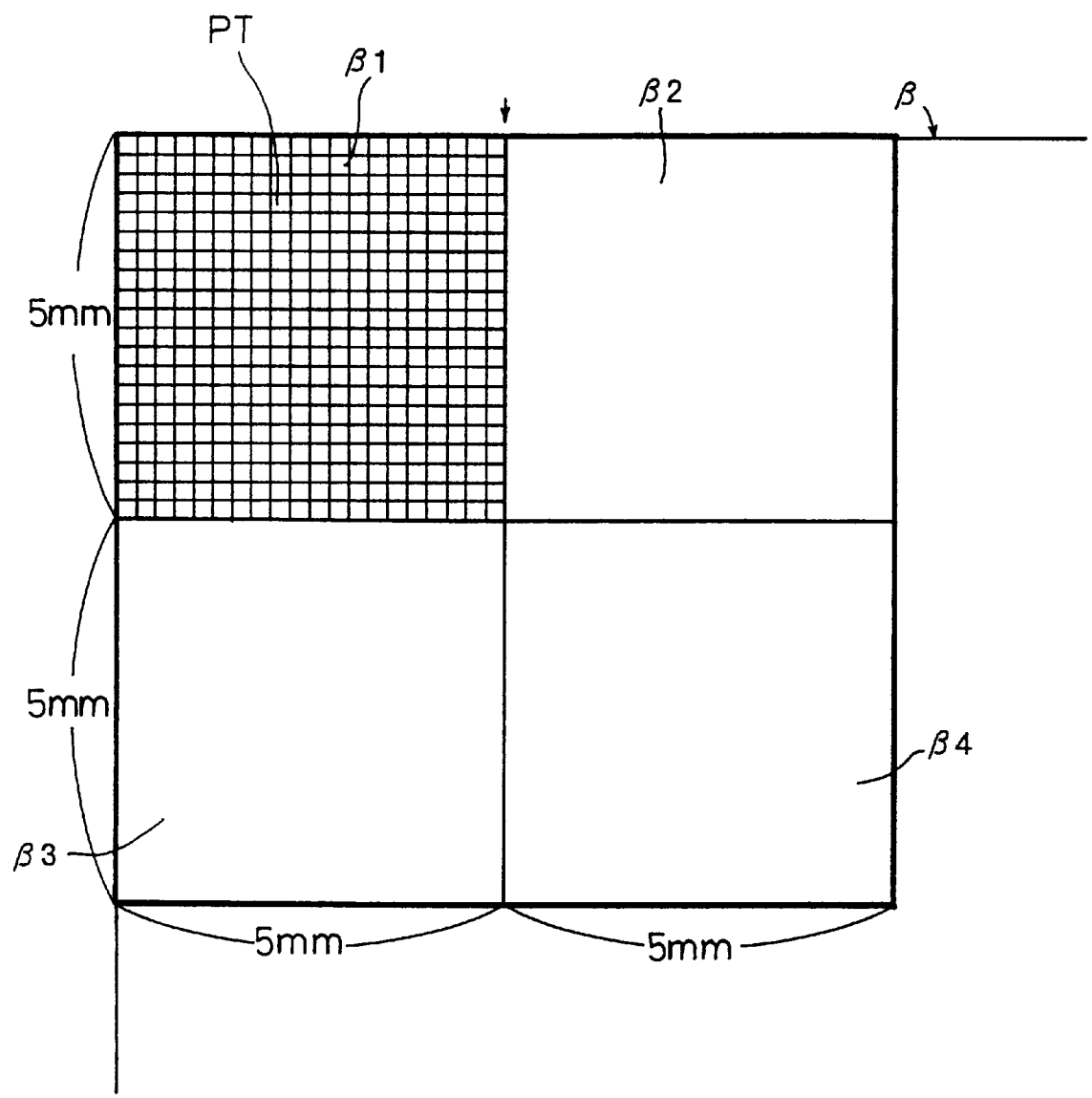
FIG. 24 is a diagram illustrative of the manner in which a paper texture template acts on colorimetric data.

FIG. 24 schematically shows the manner in which a paper texture template PT having a size of 5 mm×5 mm is applied to an area (colorimetric data) β1 having a size of 5 mm×5 mm in the colorimetric data β. When the paper texture template PT is applied to the colorimetric data β1, the elements of the colorimetric data β1 are multiplied by the corresponding elements of the paper texture template PT, producing colorimetric data β1' whose elements have been corrected. Then, when the paper texture template PT is applied to an area (colorimetric data) β2 adjacent to the area (colorimetric data) β1, since the values of the elements on a left side (edge) of the paper texture template PT are not identical to the values of the elements on a right side (edge) of the paper texture template PT, a joint based on a lightness difference appears along the edge indicated by the arrow.

To avoid such a joint, the left and right elements of the paper texture template PT may be switched around when the paper texture template PT is applied to the area β2. When the paper texture template PT is applied to another area β3 adjacent to the area β1, it is also necessary to switch around upper and lower elements of the paper texture template PT, and when the paper texture template PT is applied to still another area β4 adjacent to the areas β2, β3, it is further necessary to switch around the upper and lower elements and the left and right elements of the paper texture template PT. Accordingly, the process of applying the paper texture template PT is highly cumbersome to carry out. Actually, the time required to effect calculations is long, and the program for carrying out such calculations is complex.

According to another method of avoiding joints, a joint may be subject to a local averaging process with a suitable number of pixels, i.e., an unsharp process. This method is still time-consuming to carry out.

Figure 25:
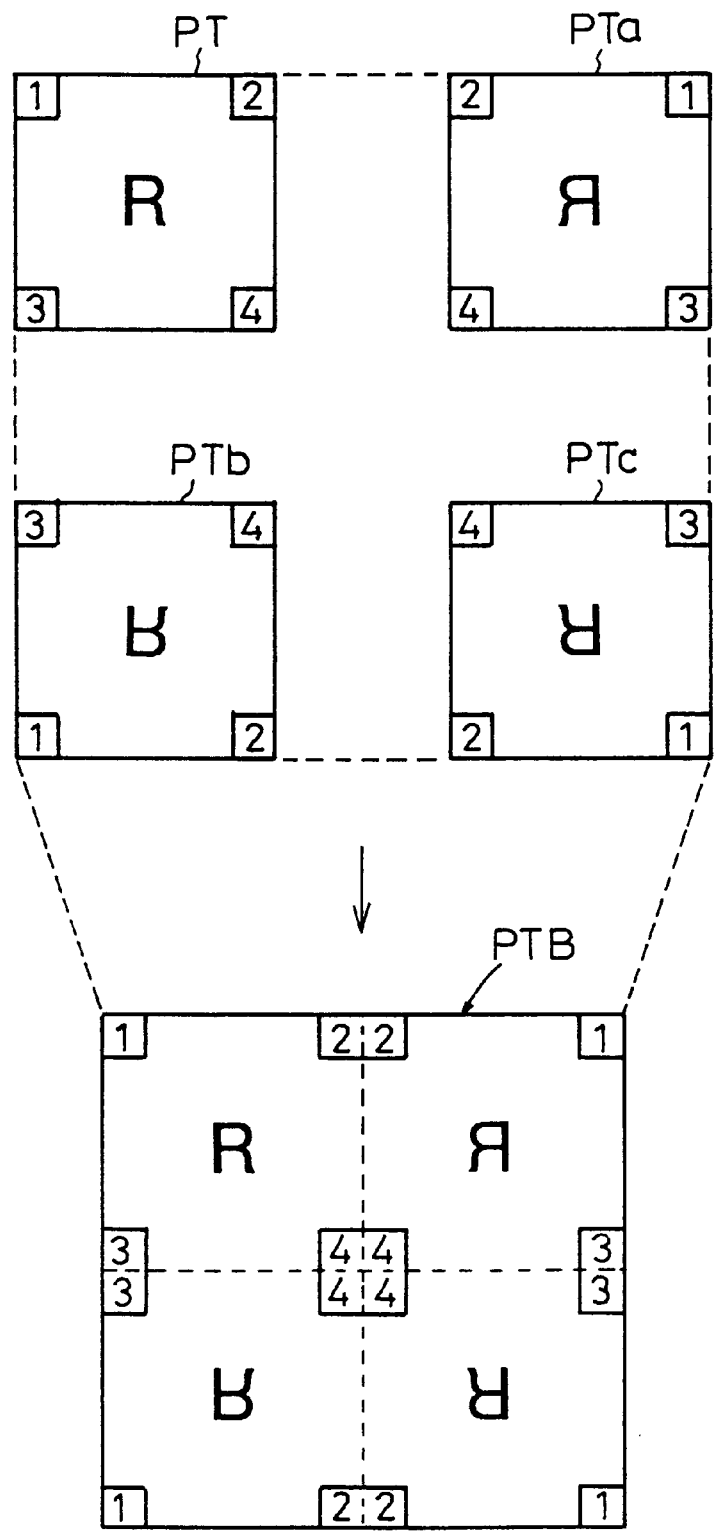
FIG. 25 is a diagram illustrative of the manner in which a paper texture template with no visually conspicuous joints is generated.

According to the present invention, as shown in FIG. 25, when a paper texture template PT having a size of 5 mm×5 mm, which is a minimum size capable of expressing paper texture, is generated, the values of elements thereof are switched around such that letters "R" drawn schematically and typically will appear as shown in FIG. 25 (also see the values "1", "2", "3", "4" of elements at the four corners of the paper texture template PT). In this fashion, other three paper texture templates PTa, PTb, PTc are generated. The generated four paper texture templates PT, PTa, PTb, PTc each having a size of 5 mm×5 mm are joined together into a larger paper texture template PTB having a size of 10 mm×10 mm.

The paper texture template PTB thus generated (see a frame represented by thick lines in FIG. 24) is applied to successive areas of the colorimetric data β without their overlapping vertically and horizontally parallel to each other. As a consequence, no joint appears at edges of colorimetric data β' when the paper texture template PTB is applied thereto.

Using the colorimetric data β' produced after the second correcting process for correcting visual irregular qualities of paper is carried out using the paper texture template PTB having a size of 10 mm×10 mm, a color proof CPb is generated by the DP 3. The color proof CPb thus generated is capable of so-called texture visually recognized as a density pattern inherent in the type of paper used as the print sheet P.

Applying the paper texture template PTB to the colorimetric data β means that the values of the respective tristimulus value data X, Y, Z of the colorimetric data β are converted respectively into the value X×a lightness ratio (the value of individual elements of the paper texture template PTB), the value Y×a lightness ratio, and the value Z×a lightness ratio. In this embodiment, the paper texture template PT remains the same for the tristimulus value data X, Y, Z. However, respective paper texture templates which are individually generated may be used for the tristimulus value data X, Y, Z.

Then, color shift corrective data γ for correcting a color shift caused by the image structure simulation process in the step S8 are generated from the colorimetric data β' generated in the step S52 and the colorimetric data α generated in the step s21, in a step S25. The color shift corrective data γ which appear at an output terminal 53 can be obtained by a simple mathematical calculation as a colorimetric data difference β'−α (=γ) or a colorimetric data ratio α/β' (=γ).

When the color shift corrective data γ thus generated are supplied from an input terminal 54 shown in FIG. 20, the color shift correcting LUT 21 can be generated.

Figure 26:
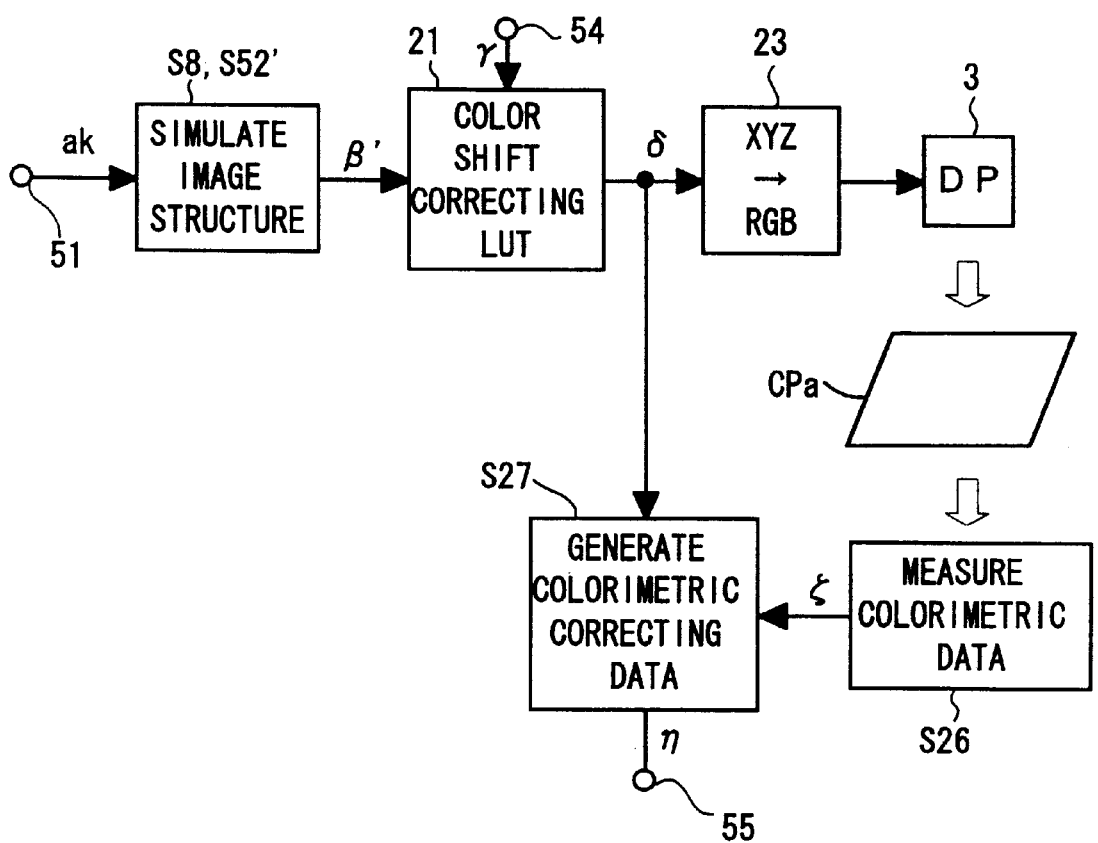
FIG. 26 is a flowchart illustrative of the generation of color shift corrective data upon use of a color printer.
Figure 27:
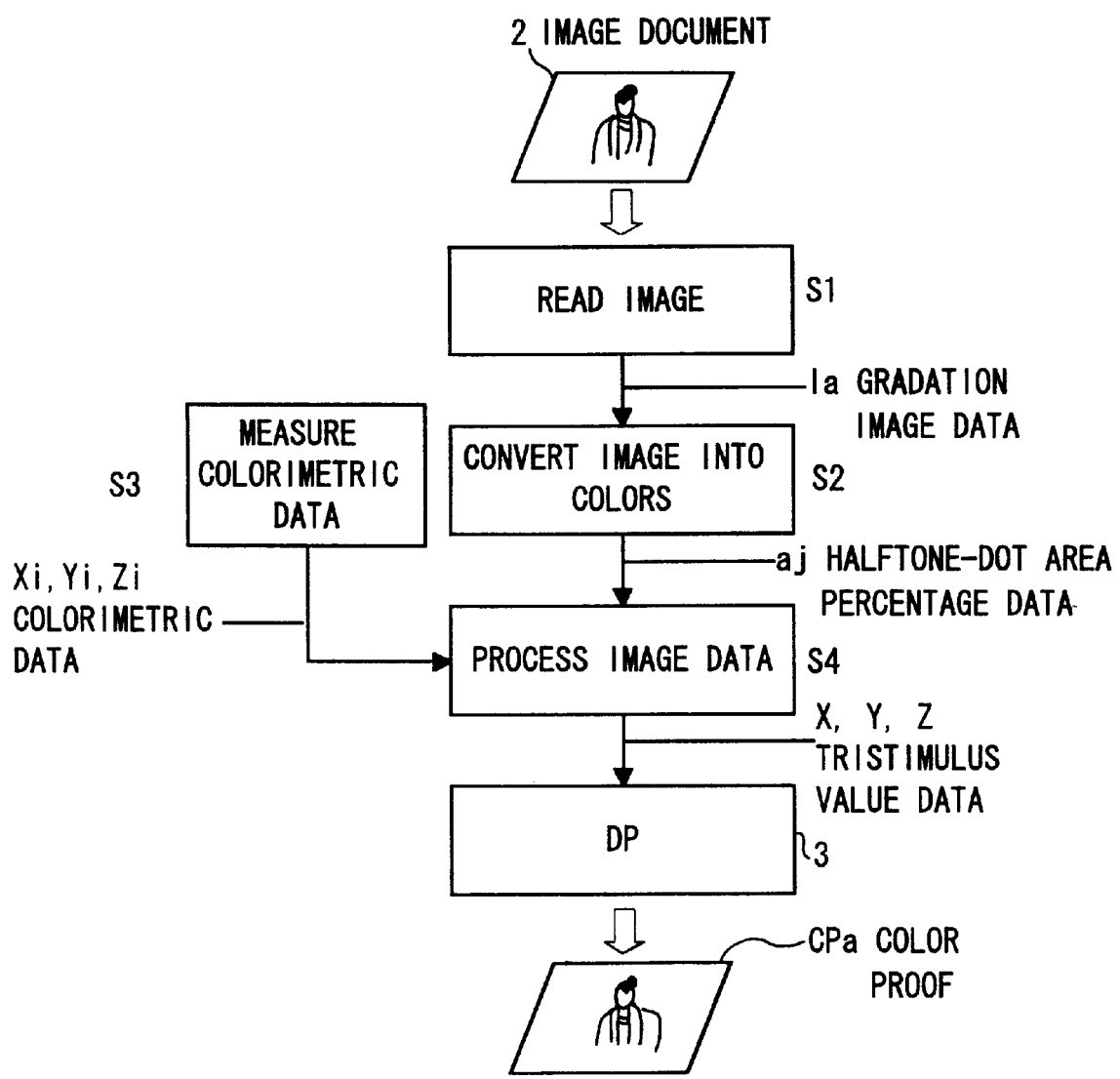
FIG. 27 is a flowchart of a conventional process of producing a color proof.

FIG. 26 is illustrative of the generation of the color shift correcting LUT 22 for correcting a color shift that is produced when the DP 3 which has a smaller color reproduction range than the color reproduction range of the color printed document 12 is used.

The halftone-dot area percentage data ak supplied to an input terminal 51 are converted into colorimetric data β' by the image structure simulation process in the step S8 and the second correcting process for correcting visual irregular qualities of paper in the step S52', and corrected colorimetric data δ (for example, δ=β'−γ=α, or δ=β'×γ=α) are produced by correcting a color shift caused by the image structure simulation process with the color shift correcting LUT 21.

Since the corrected colorimetric data δ are common color space data, which may for example be tristimulus data X, Y, Z, they are converted into color space data inherent in the DP 3, i.e., RGB data in this case, with the LUT 23. Based on the RGB data thus produced, a preliminary print proof CPa is generated as a hard copy by the DP 3.

Then, the preliminary print proof CPa is measured by a calorimeter, producing colorimetric data ζ in a step S26. Color shift corrective data η for correcting a color shift caused by the use of the DP 3 are generated from the colorimetric data ζ and the corrected colorimetric data δ in a step S27. The color shift corrective data η which appear at an output terminal 55 can also be obtained by a simple mathematical calculation as a colorimetric data difference δ−ζ (=η) or a colorimetric data ratio ζ/δ (=η) as with the color shift corrective data γ.

When the color shift corrective data η thus generated are supplied from an input terminal 56 shown in FIG. 20, the color shift correcting LUT 22 can be generated.

For generating the printed color document CPb subsequently to the above preparatory procedure in FIG. 20, a color shift caused by the image structure simulation process in the step S8 is corrected by the color shift correcting LUT 21, thus producing colorimetric data δ, and then a color shift caused by the use of the DP 3 is corrected by the color shift correcting LUT 22, thus producing colorimetric data θ. The corrected colorimetric data θ are then converted into RGB data by the LUT 23. An image on a hard copy that is generated by the DP 3 based on the RGB data, i.e., a color proof CPb, has its colors in conformity with those of the printed color document 12, and the image structure of a halftone dot image can be reproduced on the color proof CPb. The color proof CPb thus reproduces thereon interference fringes such as moiré, a rosette image, or the like which are substantially the same as those which appear on the printed color document 12, i.e., an image structure as a peculiar pattern.

Though the resolution of the DP 3 has a relatively low value of 400 DPI, it is possible to reproduce, on the printed color document 12, substantially the same interference fringes such as moiré, a rosette image, or the like as those which appear on the printed color document 12 produced by a color printing machine having a resolution of 2000 DPI (which is assumed to be 1600 DPI in this embodiment). The colors of the printed color document 12 can accurately be reproduced on the color proof CPb by the color reproduction predicting process and the color shift correcting process. The color proof CPb can thus easily and inexpensively be generated.

Because of the anti-aliasing filtering process, it is possible to remove aliasing noise (also called a false pattern due to a beat on the image) produced owing to the resolution of the DP 3, i.e., a false image structure based on the interference between the screen period due to the DP 3 and the resolution of the printer (the resolution of the DP 3).

Furthermore, the first correcting process in the step S51 for correcting visual irregular qualities of paper, i.e., a process of modifying the halftone-dot area percentage data upon being converted into bit map data b'j based on the type of the print sheet P and the halftone-dot area percentage data ap of the presensitized plates 17, is provided to reproduce "impression irregularity" and "harshness" out of the visual irregular qualities of paper. In addition, the second correcting process in the step S52 or the step S52' for correcting visual irregular qualities of paper, i.e., a process of obtaining density distributions measured from the surfaces of documents printed when the halftone-dot area percentage data ap of the presensitized plates 17 are 100% with respect to respective types of the print sheet P, and correcting the densities of colorimetric data based on the measured density distributions, is provided to reproduce "texture" out of the visual irregular qualities of paper.

While the DP 3 is employed as an image output device in the above embodiments, the DP 3 may be replaced with a color display monitor having a bit map memory and a bit map display.

According to the present invention, the existential probability of hafltone dots, rather than the Neugebauer's equation, is employed from a novel viewpoint to generate device-independent proof data for an image output device such as a color printer. The proof data thus generated are supplied to the image output device, which produces a color proof that carries an output image. The produced color proof can accurately represent a peculiar pattern such as moiré, a rosette image, or the like which is inherent in printed color documents.

Heretofore, it has been considered that a low-resolution color printer or the like having a resolution of about 400 DPI is incapable of reproducing a peculiar pattern which appears in printed color documents having a resolution of about 2000 DPI. The present invention is based on a novel concept for reproducing a peculiar pattern with such a low-resolution color printer. According to the novel concept of the present invention, cumulative histograms generated from threshold matrixes are used to determine area percentages (existential probabilities) of respective colors, and average colorimetric data are calculated from colorimetric data using the area percentages as a weighting coefficient.

A peculiar pattern such as moiré, a rosette image, or the like is reproduced on a proof according to the present invention for the reasons described below. A peculiar pattern is potentially generated due to an interference between an image and halftone dots when halftone-dot area percentage data of at least three plates including three primaries are converted into bit map data using thresholds of different screen angles. According to the present invention, the halftone-dot area percentage data are first converted into halftone dots at the resolution of a printing machine, and thereafter subjected to a filtering process to leave only components of relatively low frequencies that can visually be recognized by human eyes, thus converting the resolution into the resolution of a continuous-tone printer, i.e., a color printer. The peculiar pattern can be reproduced on a color proof by the color printer which has a train of pixels at a period shorter than the period of the potentially generated peculiar pattern.

An anti-aliasing filtering process which is employed in the present invention is capable of removing a beat due to an interference between the period of halftone dots and the resolution of the color printer while maintaining the peculiar pattern which serves as significant information on the color proof. Since the peculiar pattern is a defect that necessarily occurs on a document printed with halftone dots, the peculiar pattern needs to be generated on the color proof. On the other hand, the beat, which is a by-product of a simulation process and has no bearing on a printing process, needs to be removed.

Furthermore, the peculiar pattern can accurately be reproduced on the color proof by using steeply inclined cumulative histograms. The cumulative histograms are steeply inclined by a pre-processing process which comprises a low-pass filtering process. Accordingly, a by-product such as a beat or the like which occurs when cumulative histograms are simply steeply inclined is suppressed.

In addition, average colorimetric data are processed so as to spread average predictive colorimetric data centrally. Therefore, reproduced colors approach pure colors, with the result that the peculiar pattern can accurately be reproduced on the color proof.

According to the present invention, furthermore, for generating proof data (image data) to be supplied to an image output device for generating a proof, a process of modifying halftone-dot area percentage data upon being converted into bit map data based on the type of a print sheet and the halftone-dot area percentage data, is provided to reproduce "impression irregularity" and "harshness" out of the visual irregular qualities of paper. In addition, a process of obtaining density distributions measured from the surfaces of documents printed when the halftone-dot area percentage data are 100% with respect to respective types of print sheet, and correcting the densities of colorimetric data based on the measured density distributions, is provided to reproduce "texture" out of the visual irregular qualities of paper.

The halftone-dot area percentage data are modified by a maximum amount when the halftone-dot area percentage data are of a value in the vicinity of 50% and by a minimum amount when the halftone-dot area percentage data are of a value in the vicinity of 0% and 100%. This allows all the visual irregular qualities of paper to be accurately reproduced on the color proof at any value of the halftone-dot area percentage data.

Although certain preferred embodiments of the present invention have been shown and described in detail, it should be understood that various changes and modifications may be made therein without departing from the scope of the appended claims.

What is claimed is:

1. A method of generating proof data by converting original image pixel halftone-dot percentage data of plates C, M, Y or C, M, Y, K into bit map data to generate a proof for a printed color document, said color document being produced by a printing machine based on the bit map data with an image output device, the proof data being independent of the image output device, said method comprising the steps of:

(a) referring to threshold matrixes corresponding to original image pixel halftone-dot percentage data of respective plates (n) to determine an area percentage which represents existential probability corresponding to every $2^n$ colors, with respect to every intermediate-resolution pixel which is smaller than an output-resolution pixel of the image output device;

(b) calculating average colorimetric data for every intermediate-resolution pixel from predetermined colorimetraic data corresponding to every $2^n$ colors using said area percentage as a weighting coefficient;

(c) performing anti-aliasing filtering successively on said average colorimetric data in a range greater than said output-resolution pixel thereby converting the average colorimetric data into average colorimetric data corresponding to every output-resolution pixel as the proof data;

said step (a) comprising the steps of:

(a)(i) performing low-pass filtering on each of thresholds of said threshold matrices, said threshold matrices being in a range greater that said intermediate-resolution pixel by successively aligning central positions of filter with the thresholds of the threshold matrices;

(a)(ii) generating cumulative histograms having an argument as the central thresholds in a range of said intermediate-resolution pixel with respect to the thresholds on which said low-pass filtering process has been performed;

(a)(iii) averaging cumulative frequencies on envelopes which interconnect cumulative frequencies at the thresholds of cumulative histograms generated in step (a)(ii) to determine an average cumulative frequency, performing an emphasis process to increase the difference between the cumulative frequencies on the envelopes and a reference represented by said average cumulative frequency, and generating a cumulative histogram with respect to every central position after the emphasis process; and (a)(iv) referring to the cumulative histogram generated in (a)(iii) and the original image pixel halftone-dot percentage data of the respective plates thereby to determine the area percentage which represents existential probability corresponding to every $2^n$ colors, with respect to every intermediate-resolution pixel which is smaller than the output-resolution pixel of the image output device.

2. A method of generating proof data by converting original image pixel halftone-dot percentage data of plates C, M, Y or C, M, Y, K into bit map data to generate a proof for a printed color document produced by a printing machine based on the bit map data with an image output device, the proof data being independent of the image output device, said method comprising the steps of:

(a) referring to threshold matrixes with respect to the respective original image pixel halftone-dot percentage data of the respective plates (n) to determine an area percentage which represents existential probability with respect to every $2_n$ colors, with respect to every intermediate-resolution pixel which is smaller than an output-resolution pixel of the image output device;

(b) calculating average colorimetric data with respect to every intermediate-resolution pixel from predetermined colorimetric data with respect to every $2^n$ colors using said area percentage with respect to every $2^n$ colors as a weighting coefficient;

(c) emphasizing the average colorimetric data;

(d) effecting an anti-aliasing filtering process successively on the emphasized average colorimetric data in a range greater than said output-resolution pixel thereby to convert the average colorimetric data into average colorimetric data with respective to every output-resolution pixel as the proof data being independent of the image output device;

said step (a) comprising the step of:
generating cumulative histograms having an argument as central thresholds in a range of said intermediate-resolution pixel around central positions as the thresholds of said threshold matrixes, and determining area percentages of said original image pixel halftone-dot percentage data by referring to the cumulative histograms around the central thresholds corresponding to positions in an intermediate-pixel space of the original image pixel halftone-dot percentage data;

said step (c) comprising the step of:
determining emphasized average colorimetric data Xk' according to the equation:

$$Xk' = \{(Xk/X\text{mean})^\gamma\} \cdot X\text{mean}$$

where Xk represents the average colorimetric data before being emphasized, Xmean represents probabilistic average predictive colorimetric data, and ^ represents a power coefficient.

3. A method of generating proof data by converting original image pixel halftone-dot percentage data of plates C, M, Y or C, M, Y, K into bit map data to generate a proof for a printed color document produced by a printing machine based on the bit map data with an image output device, the proof data being independent of the image output device, said method comprising the steps of:

(a) referring to threshold matrixes with respect to the respective original image pixel halftone-dot percentage data of the respective plates (n) to determine an area percentage which represents existential probability with respect to every $2^n$ colors, with respect to every intermediate-resolution pixel which is smaller than an output-resolution pixel of the image output device;

(b) calculating average colorimetric data with respect to every intermediate-resolution pixel from predetermined colorimetric data with respect to every $2^n$ colors using said area percentage with respect to every $2^n$ colors as a weighting coefficient;

(c) emphasizing the average colorimetric data;

(d) effecting an anti-aliasing filtering process successively on the emphasized average colorimetric data in a range greater than said output-resolution pixel thereby to convert the average colorimetric data into average colorimetric data with respective to every output-resolution pixel as the proof data being independent of the image output device;

said step (a) comprising the steps of:

effecting a low-pass filtering process on each of thresholds of said threshold matrixes in a range greater than said intermediate-resolution pixel around central positions as the thresholds of said threshold matrixes;

thereafter, generating cumulative histograms having an argument as the central thresholds in a range of said intermediate-resolution pixel with respect to the thresholds on which said low-pass filtering process has been effected;

averaging cumulative frequencies on envelopes which interconnect cumulative frequencies at the thresholds of the generated cumulative histograms around the respective central positions thereby to determine an average cumulative frequency, effecting an emphasis process to increase the difference between the cumulative frequencies on the envelopes and a reference represented by said average cumulative frequency, and generating a cumulative histogram with respect to every central position after the emphasis process; and referring to the cumulative histogram with respect to every central position after the emphasis process with respect to the respective original image pixel halftone-dot percentage data of the respective plates thereby to determine the area percentage which represents existential probability with respect to every $2^n$ colors, with respect to every intermediate-resolution pixel which is smaller than the output-resolution pixel of the image output device;

said step (c) comprising the step of:

determining emphasized average colorimetric data $Xk'$ according to the equation:

$$Xk' = \{(Xk/X\text{mean})^\gamma\} \cdot X\text{mean}$$

where $Xk$ represents the average colorimetric data before being emphasized, $X\text{mean}$ represents probabilistic average predictive colorimetric data, and $\char`\^$ represents a power coefficient.

4. A method according to claim 2 or 3, wherein said probabilistic average predictive colorimetric data $X\text{mean}$ has a value produced when said emphasized average colorimetric data $Xk'$ are average a plurality of times.

5. A method according to claim 2 or 3, wherein said power coefficient $\char`\^$ has a value selected in a range from 1.0 to 3.0.

6. A method according to claim 2 or 3, wherein said probabilistic average predictive colorimetric data $X\text{mean}$ has a value produced when said emphasized average colorimetric data $Xk'$ are average a plurality of times, and said power coefficient $\char`\^$ has a value selected in a range from 1.0 to 3.0.

* * * * *